(12) United States Patent
Li et al.

(10) Patent No.: US 10,055,895 B2
(45) Date of Patent: Aug. 21, 2018

(54) LOCAL AUGMENTED REALITY PERSISTENT STICKER OBJECTS

(71) Applicant: Snap Inc., Venice, CA (US)

(72) Inventors: Jia Li, Venice, CA (US); Linjie Luo, Venice, CA (US); Rahul Sheth, Venice, CA (US); Ning Xu, Venice, CA (US); Jianchao Yang, Venice, CA (US)

(73) Assignee: Snap Inc., Venice, CA (US)

( * ) Notice: Subject to any disclaimer, the term of this patent is extended or adjusted under 35 U.S.C. 154(b) by 154 days.

(21) Appl. No.: 15/010,847

(22) Filed: Jan. 29, 2016

(65) Prior Publication Data

US 2017/0221272 A1    Aug. 3, 2017

(51) Int. Cl.
*G06T 19/20* (2011.01)
*G06T 7/20* (2017.01)
(Continued)

(52) U.S. Cl.
CPC .............. *G06T 19/20* (2013.01); *G06T 7/204* (2013.01); *G06T 7/248* (2017.01); *G06T 19/006* (2013.01);
(Continued)

(58) Field of Classification Search
CPC ..... G06T 15/08; G06T 19/003; G06T 19/006; G06T 19/20; G06T 2200/24; G06T 7/248;
(Continued)

(56) References Cited

U.S. PATENT DOCUMENTS

| 6,038,295 A | 3/2000 | Mattes |
| 6,980,909 B2 | 12/2005 | Root et al. |

(Continued)

FOREIGN PATENT DOCUMENTS

| CA | 2887596 A1 | 7/2015 |
| WO | WO-2017132506 A1 | 8/2017 |

OTHER PUBLICATIONS

"International Application Serial No. PCT/US2017/015330, International Search Report dated Apr. 19, 2017", 5 pgs.
(Continued)

*Primary Examiner* — Ke Xiao
*Assistant Examiner* — Kim-Thanh T Tran
(74) *Attorney, Agent, or Firm* — Schwegman Lundberg & Woessner, P.A.

(57) ABSTRACT

Systems and methods for local augmented reality (AR) tracking of an AR object are disclosed. In one example embodiment a device captures a series of video image frames. A user input is received at the device associating a first portion of a first image of the video image frames with an AR sticker object and a target. A first target template is generated to track the target across frames of the video image frames. In some embodiments, global tracking based on a determination that the target is outside a boundary area is used. The global tracking comprises using a global tracking template for tracking movement in the video image frames captured following the determination that the target is outside the boundary area. When the global tracking determines that the target is within the boundary area, local tracking is resumed along with presentation of the AR sticker object on an output display of the device.

20 Claims, 24 Drawing Sheets

(51) Int. Cl.
*G06T 19/00* (2011.01)
*H04L 12/58* (2006.01)
*G06T 7/246* (2017.01)

(52) U.S. Cl.
CPC .... *H04L 51/32* (2013.01); *G06T 2207/20104* (2013.01)

(58) Field of Classification Search
CPC ........... G06T 7/204; G06T 2207/20104; H04L 51/32
USPC .......................................................... 345/633
See application file for complete search history.

(56) References Cited

U.S. PATENT DOCUMENTS

| | | |
|---|---|---|
| 7,173,651 B1 | 2/2007 | Knowles |
| 7,411,493 B2 | 8/2008 | Smith |
| 7,535,890 B2 | 5/2009 | Rojas |
| 8,131,597 B2 | 3/2012 | Hudetz |
| 8,199,747 B2 | 6/2012 | Rojas et al. |
| 8,332,475 B2 | 12/2012 | Rosen et al. |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,443,227 B2 | 9/2016 | Evans et al. |
| 9,489,661 B2 | 11/2016 | Evans et al. |
| 9,491,134 B2 | 11/2016 | Rosen et al. |
| 2011/0090344 A1 | 4/2011 | Gefen et al. |
| 2011/0202598 A1 | 8/2011 | Evans et al. |
| 2012/0038669 A1* | 2/2012 | Lee .......................... G06F 3/011 345/633 |
| 2012/0105475 A1* | 5/2012 | Tseng ................. G01C 21/3611 345/633 |
| 2012/0209924 A1 | 8/2012 | Evans et al. |
| 2013/0201185 A1* | 8/2013 | Kochi ..................... G06F 3/011 345/419 |
| 2016/0353239 A1* | 12/2016 | Kjellsson .............. H04W 4/021 |
| 2016/0378294 A1* | 12/2016 | Wright ................ G06F 3/04815 715/851 |

OTHER PUBLICATIONS

"International Application Serial No. PCT/US2017/015330, Written Opinion dated Apr. 19, 2017", 8 pgs.

Geraldo, Silveira, et al., "Unified Direct Visual Tracking of Rigid and Deformable Surfaces Under Generic Illumination Changes in Grayscale and Color Images", International Journal of Computer Vision, voi. 89, No. 1, (Feb. 24, 2010), 84-105 pgs.

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

Meyer, F G, "Region-Based Tracking Using Affine Motion Models in Long Image Sequences", CVGIP Image Understanding, Academic Press, voi. 60, No. 2, (Sep. 1, 1994), 119-140 pgs.

Wagner, D, et al., "Real-Time Detection and Tracking for Augmented Reality on Mobile Phones", IEEE Transactions on Visualization and Computer Graphics, IEEE Service Center, (May 1, 2010), 355-368 pgs.

Wagner, D, et al., "Robust and unobtrusive marker tracking on mobile phones", Mixed and Augmented Reality, 7th IEEE/ACM International Symposium, (Sep. 15, 2008), 121-124 pgs.

* cited by examiner

400

PROCESSING A USER INPUT ASSOCIATING A FIRST PORTION OF A FIRST IMAGE OF THE VIDEO IMAGE FRAMES WITH AN AR STICKER OBJECT AND A TARGET
402

GENERATING, BASED ON THE USER INPUT AND THE FIRST PORTION OF THE FIRST IMAGE, A FIRST TARGET TEMPLATE ASSOCIATED WITH THE TARGET
404

TRACKING THE TARGET ACROSS FRAMES OF THE VIDEO IMAGE FRAMES FOLLOWING THE FIRST IMAGE BY CALCULATING CHANGES IN THE FIRST PORTION OF THE FIRST IMAGE USING THE FIRST TARGET TEMPLATE
406

INITIATING A GLOBAL TRACKING BASED ON A DETERMINATION THAT THE TARGET IS OUTSIDE A BOUNDARY AREA, THE GLOBAL TRACKING COMPRISING USING A GLOBAL TRACKING TEMPLATE FOR TRACKING MOVEMENT IN THE VIDEO IMAGE FRAMES CAPTURED FOLLOWING THE DETERMINATION THAT THE TARGET IS OUTSIDE THE BOUNDARY AREA
408

RESUMING TRACKING THE TARGET WHEN THE GLOBAL TRACKING DETERMINES THAT THE TARGET IS WITHIN THE BOUNDARY AREA
410

FIG. 4

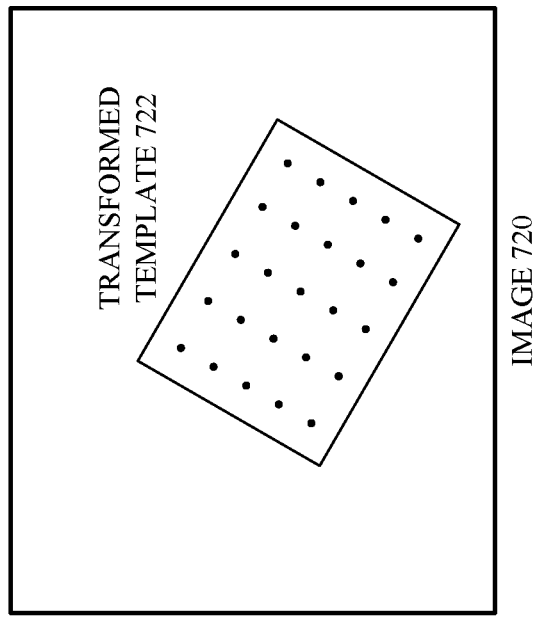
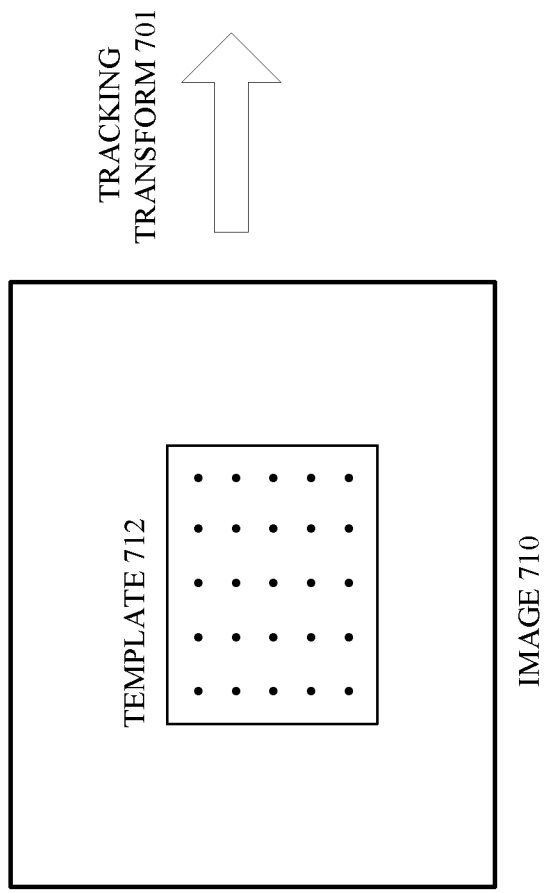
FIG. 7

LOCAL AUGMENTED REALITY PERSISTENT STICKER OBJECTS

BACKGROUND

Augmented reality refers to using computer generated enhancements to add new information into images in a real-time or near real-time fashion. For example, video images of a wall output on a display of a device may be enhanced with display details that are not present on the wall, but that are generated to appear as if they are on the wall by an augmented reality system. Such systems use a complex mix of image capture information that is integrated and matched with the augmented reality information that is to be added to a captured scene in a way that attempts to seamlessly present a final image from a perspective determined by the image capture device.

BRIEF DESCRIPTION OF THE DRAWINGS

Various ones of the appended drawings merely illustrate example embodiments of the present disclosure and should not be considered as limiting its scope.

FIG. 4 describes a method for local tracking of augmented reality objects, according to some example embodiments.

FIG. 7 illustrates aspects of local tracking of augmented reality objects, according to some embodiments.

DETAILED DESCRIPTION

Figure 1:
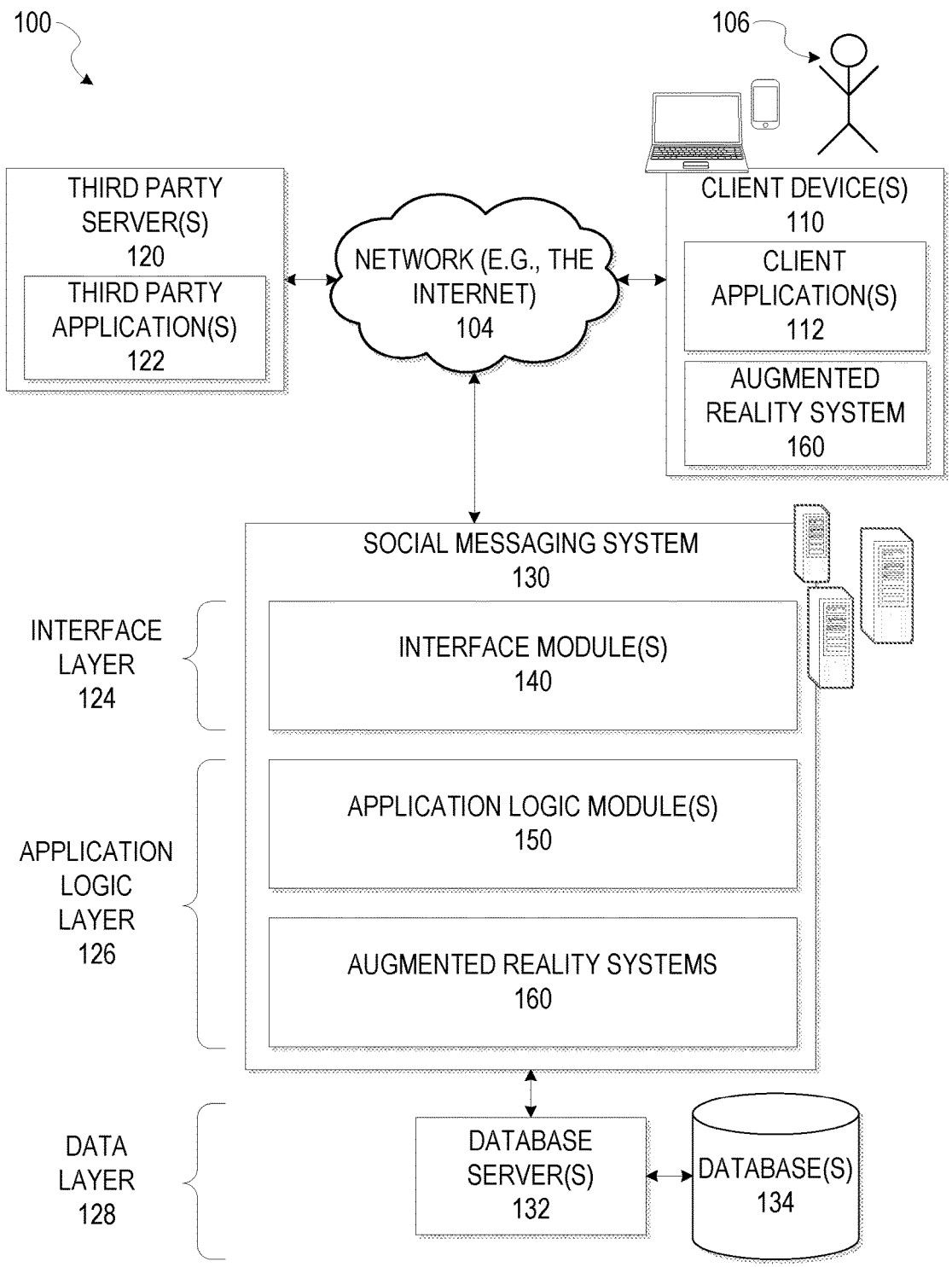
FIG. 1 is a block diagram illustrating a networked system, according to some example embodiments.

The following relates to local augmented reality image processing and image-based tracking. Some particular embodiments describe using local modeling as images are captured by a device and presented on a display of the device. This may be done without a previously generated model of the environment. Embodiments enable an augmented reality (AR) object to be attached to a target portion of a video frame. The device then tracks the AR object locally, such that the target is tracked locally from the video frame data on the device when the target and the AR object are not present in the image currently being captured and presented on the display of the device. In some embodiments, as the target and the AR object move in and out of the video image, the AR tracking may switch from a target tracking to a global tracking of movement in the entire image. Additional details and various embodiments are described below.

The description that follows includes systems, devices, and methods that illustrate embodiments of the disclosure. In the following description, for the purposes of explanation, numerous specific details are set forth in order to provide an understanding of various embodiments of the subject matter. It will be evident, however, to those skilled in the art, that embodiments of the inventive subject matter may be practiced without these specific details.

AR, as described herein, refers to systems and devices that capture images, enhance those images with additional information, and then present the enhanced images on a display. This enables, for example, a user to hold up a phone to capture a video stream of a scene, and an output display of the phone to present the scene as visible to the user along with additional information. This information may include virtual objects presented as if they existed in the scene. Aspects of such virtual objects are processed to occlude the virtual object if another real or virtual object passes in front of the virtual object as shown from the perspective of the image sensor capturing the environment. Such virtual objects are also processed to maintain their relationship with real objects as both real and virtual objects move over time, and as the perspective of the image sensor capturing the environment changes.

One way of tracking the actual location of a device is to start with a highly accurate model of an environment, and to compare the model with image data from the device. Such systems may use both a previously generated AR database describing the environment or scene being captured and a system for aligning the information being captured with the model and data from the AR database. Accessing data from a database and performing this alignment is a resource intensive process, particularly for smaller mobile or wearable devices. Embodiments described herein include systems for presenting AR images without such complex environment models. Instead, in various embodiments described herein, the initial video images captured by the device are used to initialize tracking of AR objects placed in a scene by a user input. While such systems do not enable complex sharing of AR information between devices without additional systems, the AR embodiments described herein enable simple AR functionality on devices that are resource limited. Embodiments do enable recording of AR videos using AR objects added to a scene by a user of the device, with the AR objects persisting in the environment as the image captured moves away from and back to a target that the AR object is attached to. Various types of AR objects such as face masks, emoji, arrows, text, two- or three-dimensional animated AR objects, or other such AR objects may be used with the various embodiments described herein.

For example, in one embodiment, a user of a smart phone may enter an AR mode, which initiates capture of video image frames. As the frames are captured, they are displayed on a touch screen component of the phone. An interface enables selection of an AR arrow object, which is placed by a user input on a portion of a video image displayed on the screen. This placement associates the AR arrow object with a target, which may be an object, a person, or any other element of the image currently displayed. As the target moves within the video image, either due to movement of the target or movement of the camera, local tracking of the object makes the AR output images displayed on the device keep the AR object in a stable position relative to the target. As the target and the associated AR object move out of the image frame, the tracking uses a global template of the image to estimate the position of the target, which is no longer entirely within the displayed image. When the target re-enters the image being captured by the camera, the global tracking merges back with the local tracking of the target, and the AR object is again presented on the output display.

FIG. 1 is a network diagram depicting a network system 100 having a client-server architecture configured for exchanging data over a network, according to one embodiment. Such a network system may be used to communicate information, such as data for modules to implement local AR as described herein, as well as messaging systems for communicating AR videos recorded by client devices using local AR tracking of persistent sticker objects, referred to herein as AR objects. In some embodiments, the network system 100 may be an ephemeral messaging system where clients communicate and exchange data within the network system 100 using messages with deletion triggers. Additionally, in some embodiments, the local AR tracking described herein may be integrated with other types of systems and data that may be communicated in a message system. The data may pertain to various functions (e.g., sending and receiving text and media communication, determining geolocation, etc.) and aspects associated with the network system 100 and its users. Although the network system 100 is illustrated herein as having a client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1. represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as having a three-tiered architecture, the subject matter described herein is by no means limited to such an architecture.

As shown in FIG. 1, the interface layer 124 consists of interface modules (e.g., a web server) 140, which receive requests from various client computing devices and servers, such as client devices 110 executing client applications 112, and third party servers 120 executing third party applications 122. In response to the received requests, the interface modules 140 communicate appropriate responses to the requesting devices via a network 104. For example, the interface modules 140 can receive requests such as Hypertext Transfer Protocol (HTTP) requests or other web-based Application Programming Interface (API) requests.

The client devices 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client devices 110 are executing the client applications 112, which include AR system(s) 160 implementing various embodiments described herein. The client applications 112 can provide functionality to present information to a user 106 and communicate via the network 104 to exchange information with the social messaging system 130. Each of the client devices 110 can comprise a computing device that includes at least a display and communication capabilities with the network 104 to access the social messaging system 130. The client devices 110 comprise, but are not limited to, remote devices, work stations, computers, general purpose computers, Internet appliances, hand-held devices, wireless devices, portable devices, wearable computers, cellular or mobile phones, personal digital assistants (PDAs), automotive computing devices with driver heads up displays (HUDs), smart phones, tablets, ultrabooks, netbooks, laptops, desktops, multi-processor systems, microprocessor-based or programmable consumer electronics systems, game consoles, set-top boxes, network personal computers (PCs), mini-computers, and the like. The users 106 can include a person, a machine, or other means of interacting with the client devices 110. In some embodiments, the users 106 interact with the social messaging system 130 via the client devices 110.

As shown in FIG. 1, the data layer 128 has one or more database servers 132 that facilitate access to information storage repositories or databases 134. The databases 134 are storage devices that store data such as sets of images of external areas generated by the client devices 110 and sent to the social messaging system 130; sets of façade data generated from images including buildings; map data matching the images and façade data to geolocations; and other such data. In one embodiment, the database 134 stores images generated by the client devices 110 running augmented reality (AR) system 160 modules, and stores videos including AR objects tracked using embodiments as described herein. These video clips may then be communicated between different devices in various ways by the social messaging system 130. Additionally, in some embodiments, the databases 134 may store different AR objects which may be communicated to different client devices 110 based on various system triggers, such that certain AR objects may only be available to some client devices 110, and some AR objects may only be available to a particular client device 110 at certain times or given certain device or system states. The databases 134 may also store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the social messaging system 130, including aspects of the AR system 160. For instance, a social messaging application can be implemented with one or more of the application logic modules 150. The social messaging application provides a messaging mechanism for users of the client devices 110 to send and receive messages that include text and media content such as pictures and video. The social messaging application may also include mechanisms for providing AR displays and content that integrate pictures and video with virtual objects. The client devices 110 may provide AR displays and may also enable users to access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Similarly, AR content may be provided for a predefined duration. Other applications and services may be separately embodied in their own application logic modules 150. As described above, while aspects of the AR systems 160 may be implemented on the social messaging system 130, the local AR tracking described herein refers to elements or modules of the AR system 160 performed at a client device 110 that captures images and applies AR objects as overlays or filters to the locally captured images. Server-implemented aspects of the AR systems 160 may modify the available AR objects, or implement AR video communications, but may not include processing to generate the AR images described herein.

As illustrated in FIG. 1, the social messaging system 130 or the client applications 112 include the AR system 160 that provides functionality to generate AR images. In some embodiments, the AR system 160 can be implemented as a standalone system on a client device 110 and is not necessarily included in the social messaging system 130. In other embodiments, the client devices 110 include a portion of the AR system 160 (e.g., a portion of the AR system 160 may be included independently or in the client applications 112). In embodiments where the client devices 110 include a portion of the AR system 160, the client devices 110 can work alone or in conjunction with the portion of the AR system 160 included in a particular application server or included in the social messaging system 130.

Figure 2:
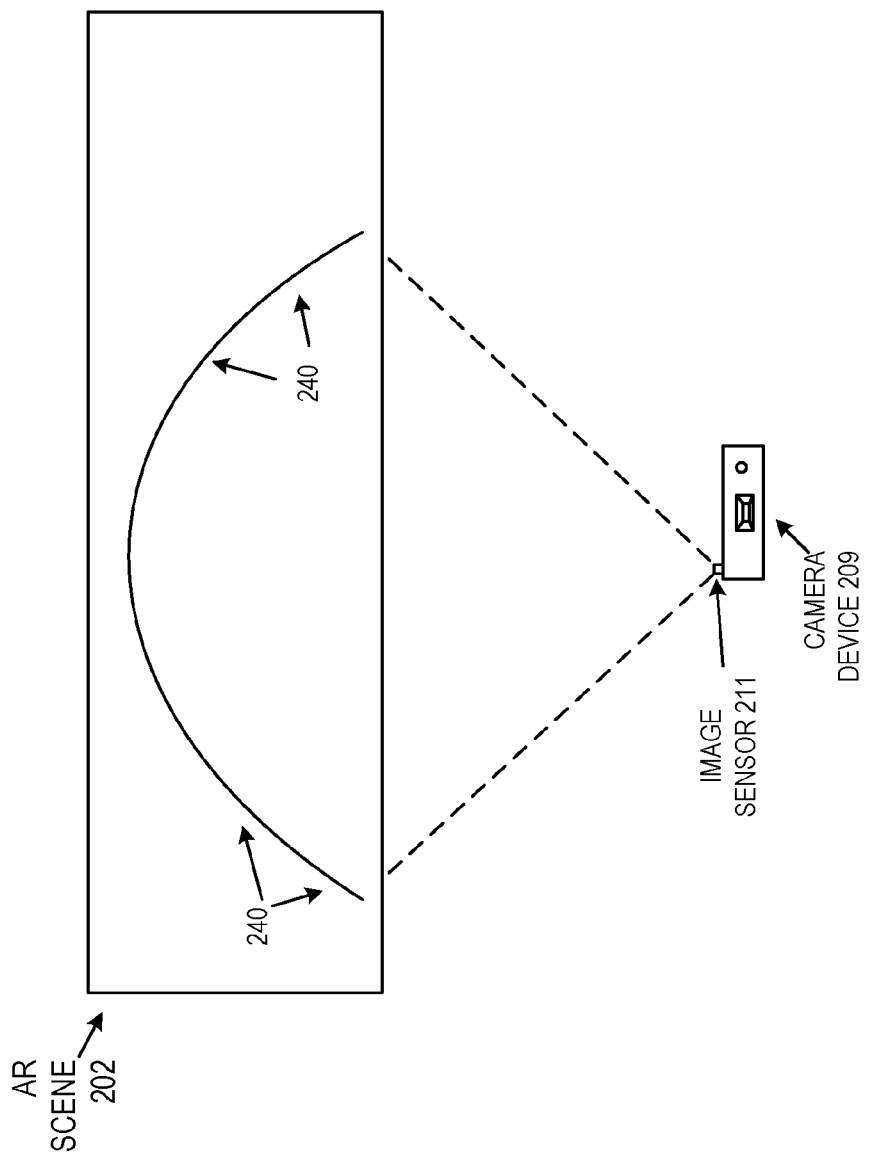
FIG. 2 illustrates aspects of an augmented reality system, according to some embodiments.

FIG. 2 illustrates aspects of an AR system. As discussed above, an AR system incorporates virtual objects into a scene captured by an image sensor. FIG. 2 shows an AR scene 202 including image data 240 captured by an image sensor 211 of a camera device 209. The image data 240 includes information about physical objects in space distributed over a scene. In order to generate the AR scene 202, the scene generated from the image data 240 is modified to add virtual object data.

FIGS. 3A-I illustrate aspects of an embodiment using a sequence of images that may be considered sample images from a series of video image frames captured by a device such as the client device 110. The images are captured by an image sensor of the device and processed using one or more processors of the device to track a target locally and present an output image with AR objects presented relative to the target for at least a portion of the video image frames. The illustrated aspects described by FIGS. 3A-I do not include an AR object that would be displayed on an output display. Instead, FIGS. 3A-I illustrate tracking of a target 312 in a series of images. The target 312 may be identified by a user input placing an AR object (not shown) on a first image 310 of FIG. 3A. The target 312 may alternatively be identified by any other such user inputs or selections which result in the target 312 being identified by an AR system of a device.

Figure 3A:
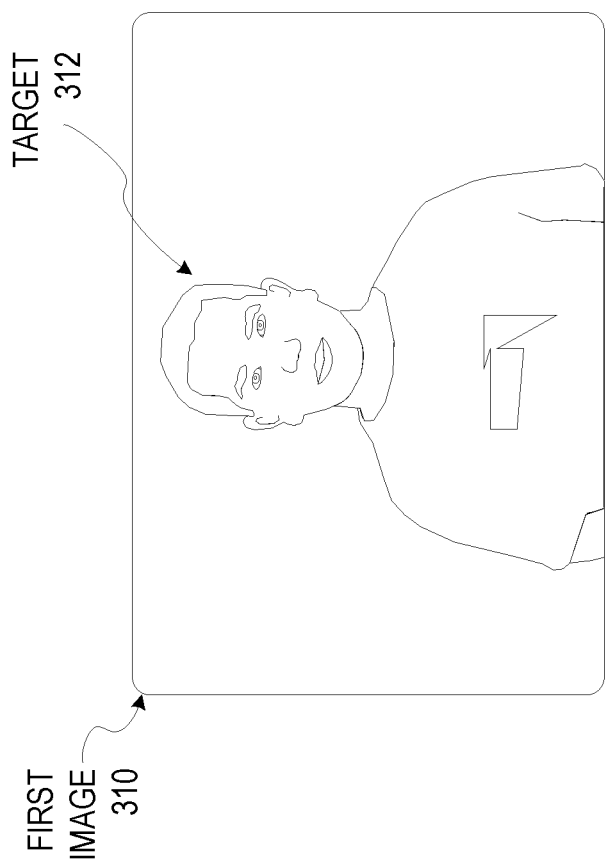
FIG. 3A illustrates aspects of local tracking of augmented reality objects, according to some example embodiments.
Figure 3B:
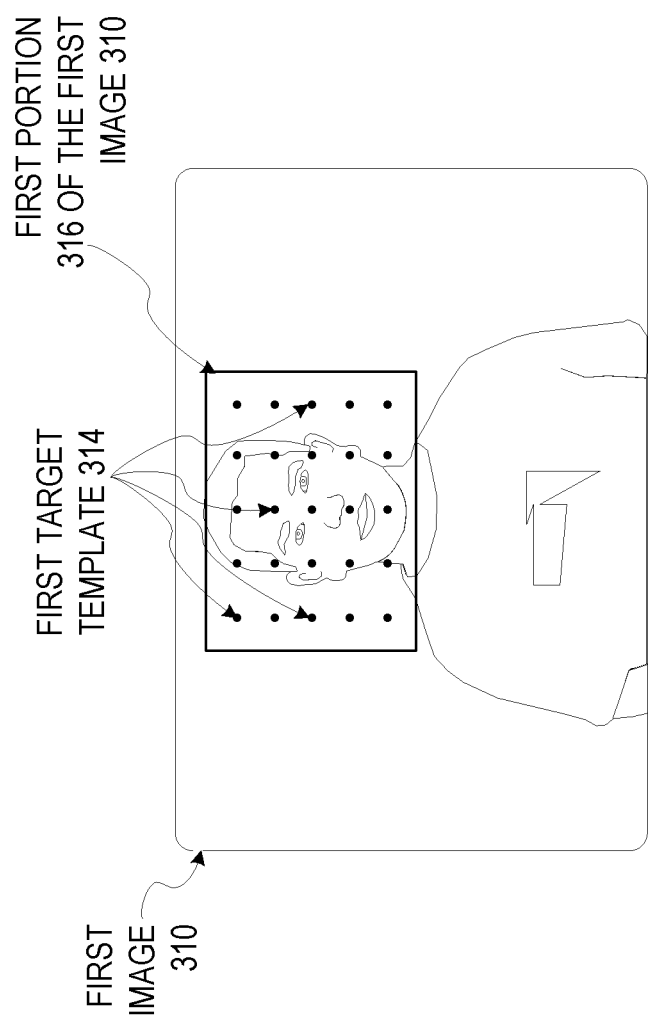
FIG. 3B illustrates aspects of local tracking of augmented reality objects, according to some example embodiments.

After the target 312 is identified as described above, FIG. 3B illustrates a first target template 314 generated from a first portion 316 of the first image 310. In various embodiments, various portions of the first image 310 where the AR object is associated with the target 312 may be used. The portions may be specifically selected by a user, may be based on a characteristic of an AR object, or may be dynamically determined by the device. For example, a mask overlay AR object may have a target area that is a portion of an image identified as a target face. An arrow AR object may have a target area that is the portion of the image set just at the end of the arrow head. In some embodiments, a user interface may show a user the area to be set as the target area. In other embodiments, the target area may be implied to the user without being shown in the input/output component when the target area is selected. In the embodiment of FIG. 3B, the first portion 316 associated with the target 312 is the head of a person in an AR video scene. The first target template 314 is a collection of color values sampled at various sample points around the target 312. In various embodiments, the sample values and the pattern of samples may be determined in different ways for different embodiments. While FIG. 3B and other figures show a grid of spaced sample points, the template may be made of sample points selected based on key features of the target area, including denser sampling at areas of high complexity.

Figure 3C:
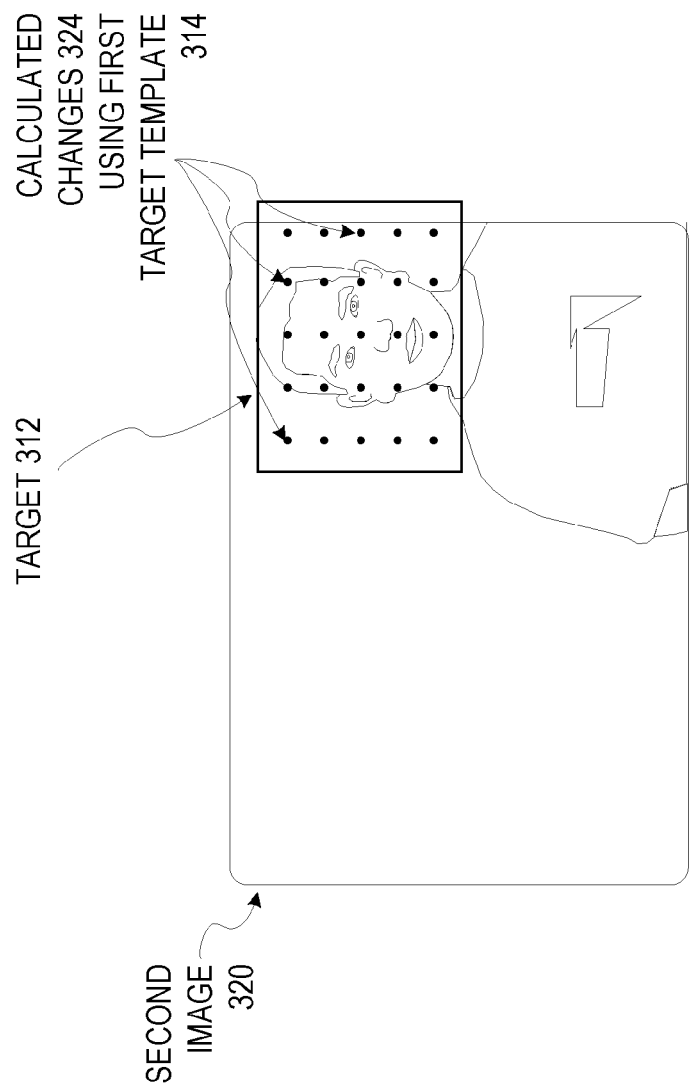
FIG. 3C illustrates aspects of local tracking of augmented reality objects, according to some example embodiments.

In a subsequent second image 320 of FIG. 3C, the target 312 has moved in the frame of the video image. The AR model includes calculated changes 324 that are based on the initial template samples from the first target template 314. In some embodiments, the calculated changes 324 identify the target 312 by determining a matching pattern that is a closest match to the values of the first target template 314. As video frames are captured with the target 312 moving within the frame, this matching allows tracking of the target 312, and an AR object (not shown) to maintain a constant relative position with respect to the target 312.

Figure 3D:
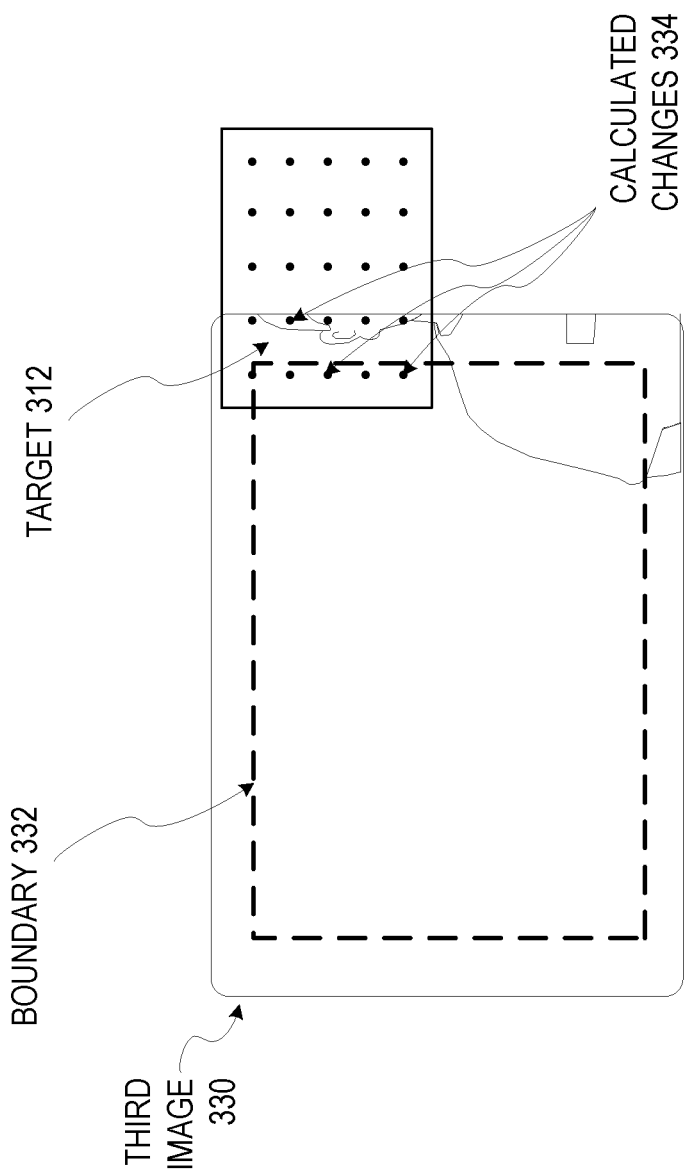
FIG. 3D illustrates aspects of local tracking of augmented reality objects, according to some example embodiments.
Figure 3E:
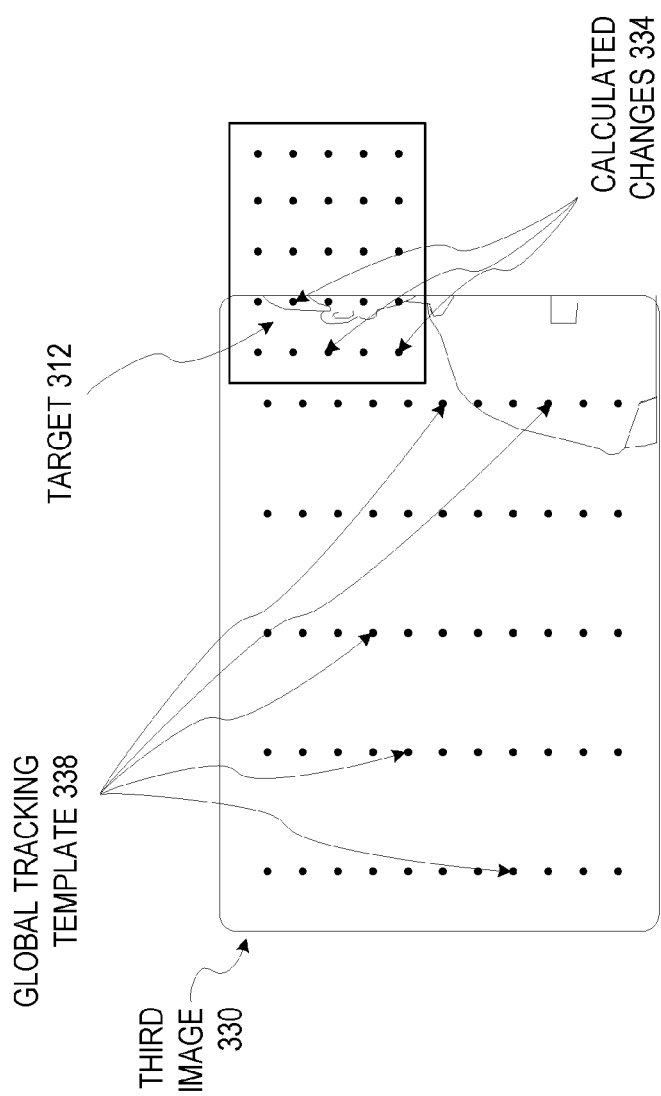
FIG. 3E illustrates aspects of local tracking of augmented reality objects, according to some example embodiments.
Figure 3F:
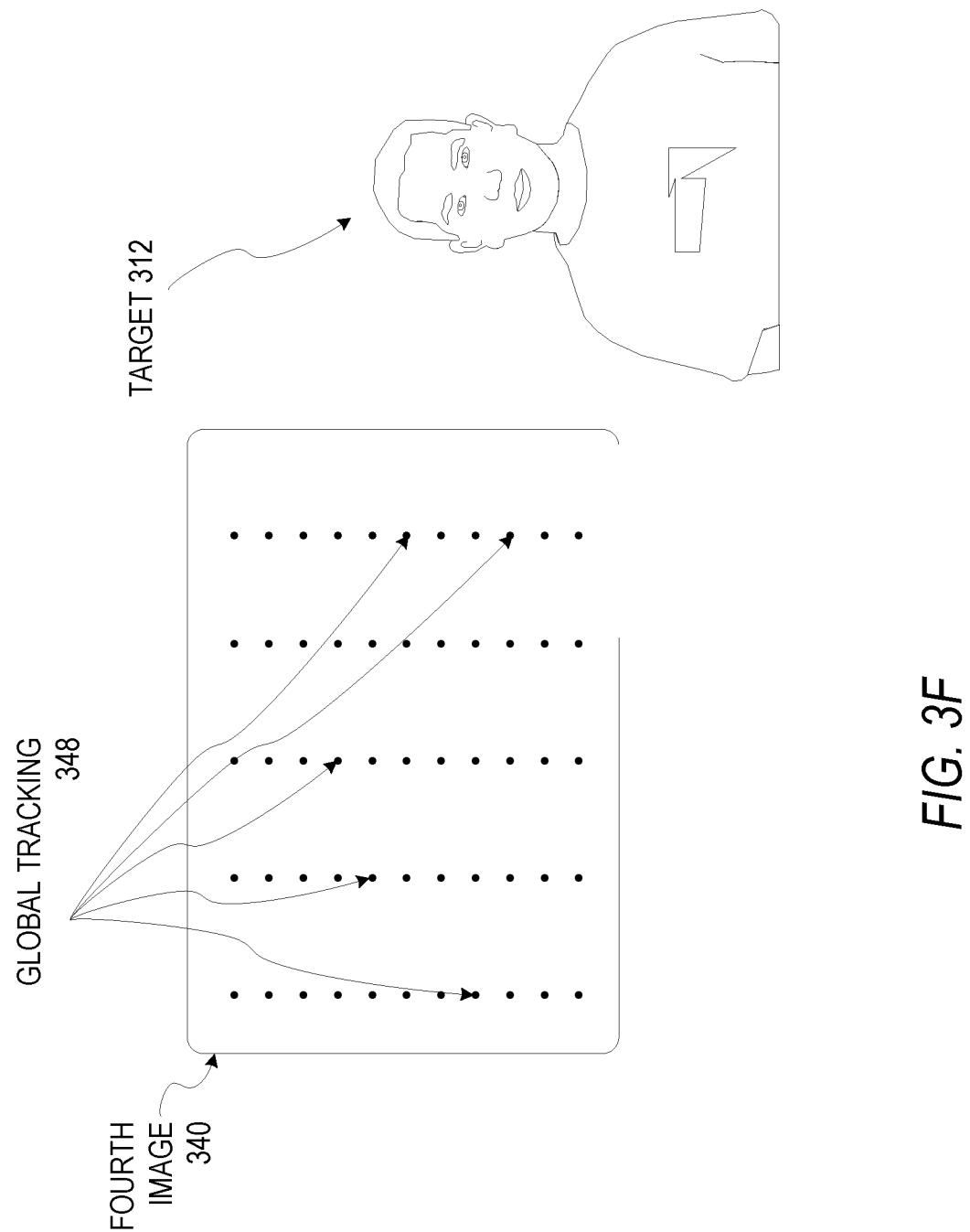
FIG. 3F illustrates aspects of local tracking of augmented reality objects, according to some example embodiments.

As the device continues to capture images of the scene including the target 312, the target 312 may move to an edge of the frame, as illustrated by FIG. 3D. in some embodiments, a boundary 332 may be identified. The boundary 332 may be a set number of pixels from an edge of the image, or may be any pattern set by the system for identifying that the target 312 is moving out of the frame. In an illustrated third image 330 in FIG. 3E, the target 312 is moving off the right edge of the third image 330. Only a portion of matching calculated changes 334 are visible as the area associated with the target 312 moves out of the area captured by the image sensor. Once the available calculated changes 334 fall below a threshold amount, a global tracking template 338 may be initiated, as shown in FIG. 3F. For example, if less than half of the sampling points from the first target template 314 are associated with the calculated changes 334 for a particular frame, the global tracking template 338 may be initiated. In other embodiments, a center sample of the first target template 314 may be identified, and when a calculated change 334 associated with this center point is outside the boundary 332, the system may begin global tracking. In some embodiments, multiple boundaries 332 may be present, such that both target 312 tracking and global tracking may occur for certain intermediate boundaries. In such embodiments, one or more boundaries 332 may be outside the edge of the image frame, with the target 312 position relative to this external boundary 332 estimated based on movement identified by the global tracking template 338. The model may continue to track the position of target 312 using template positions that are associated with points outside of the frame captured by third image 330 as well as points still within third image 330, shown as calculated changes 334. In other embodiments, only the points associated with points from third target template 314 that are still in the frame (e.g. calculated changes 334) are tracked by the system to estimate first target 312 positioning.

FIG. 3F illustrates the target 312 completely outside of the frame of a fourth image 340. As additional images are captured using global tracking 348, the changes in the entire scene as processed using the global tracking 348 are used to estimate motion of the camera. Additional processing related to movement of the target 312 prior to the target 312 leaving the frame may be used to estimate a current position of the target 312 relative to the currently captured image. In some embodiments, the target 312 may have limited movement, or the system may present an error indicating that the target tracking is lost if the target 312 moves in a way that is not captured by the processing and tracking means described herein.

Figure 3G:
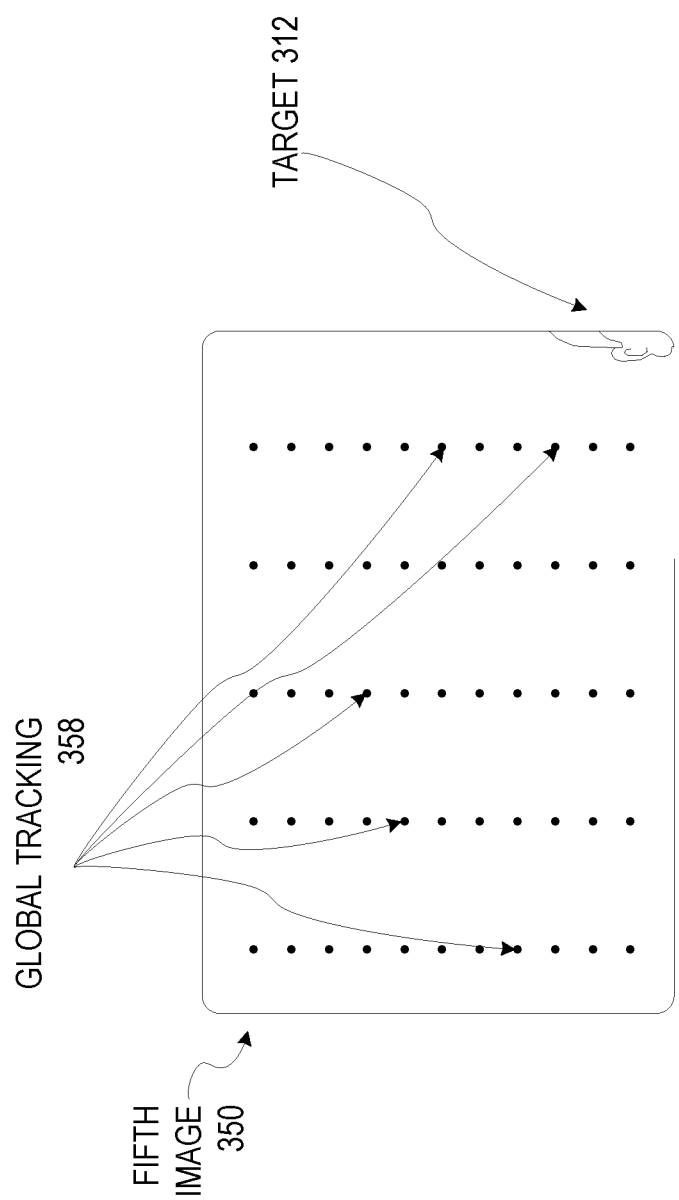
FIG. 3G illustrates aspects of local tracking of augmented reality objects, according to some example embodiments.
Figure 3H:
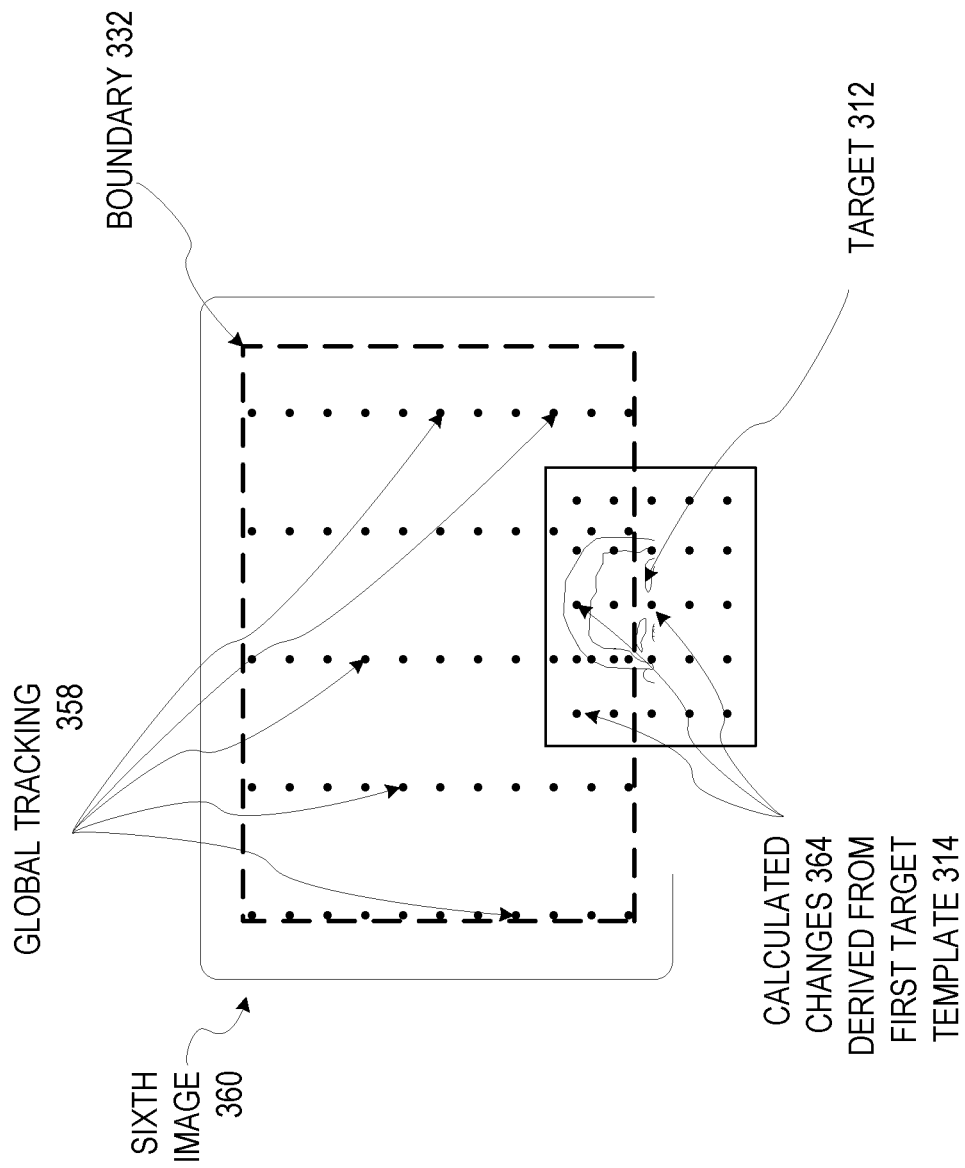
FIG. 3H illustrates aspects of local tracking of augmented reality objects, according to some example embodiments.
Figure 3I:
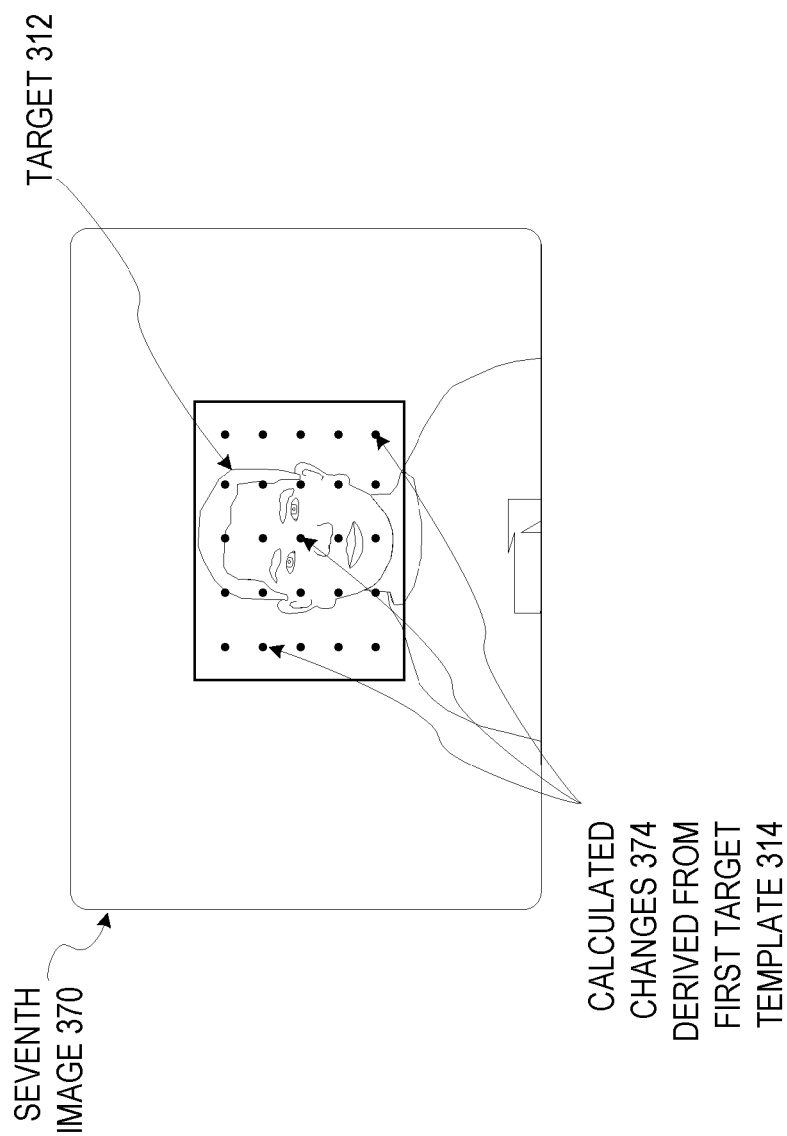
FIG. 3I illustrates aspects of local tracking of augmented reality objects, according to some example embodiments.

In FIG. 3G, the target 312 is just beginning to re-enter the frame in a fifth image 350. Global tracking 358 of the entire fifth image 350 is used to model movement of the camera. In some embodiments, a target tracking module may also process the fifth image 350 for portions of the target 312 using data from the first target template 314 and calculated changes (e.g., 324, 334) from previous images. At a certain point, as illustrated by FIG. 3H, the target 312 may re-enter the frame such that the first target template 314 and subsequent calculated changes may be used to re-acquire tracking of the target 312. In a sixth image 360, calculated changes 364 are sufficient to identify the target 312. As the target 312 is identified, the AR object (not shown) will also be presented on the output display of the device along with some or all of the target 312. As the target 312 moves in and out of the boundary 332 of the frame, the processing of the particular images such as the sixth image 360 may vary back and forth between global tracking 358 that analyzes the entire sixth image 360, and targeted tracking using calculated changes derived from the first target template 314 that tracks only the target 312. FIG. 3I shows a seventh image 370 where the target 312 is back within a boundary area and global tracking has paused. Calculated changes 374 derived from the first target template 314 are used to track the target 312, until the AR operation ends or the target 312 moves back to the edge of the frame. In some embodiments, both target tracking using calculated changes and global tracking may occur at the same time. In some embodiments, the global tracking 358 builds an AR model of the entire scene as the image frames are captured, but with additional processing to track targets outside the image frame where needed.

FIG. 4 describes a method 400 for persistent local tracking of AR objects. The method 400 may be performed by any client device described herein having an associated camera and output display. As described above, this may be a single integrated device, or may be a client device with a paired wearable device or camera connected using local wireless communication.

In some embodiments, a device implements the method 400, with the device including an integrated display, and an input component coupled to the display which may be, for example, a touch screen. The device also includes a memory coupled to the display and the input component and an image sensor for capturing images of a scene. The device further includes one or more processors coupled to the display, the image sensors, the input component, and the memory, the one or more processors configured to process video image frames captured by the image sensor and output local AR images using local AR tracking of an AR sticker object that is "stuck" or associated with a target in a scene.

The method 400 includes processing a user input associating a first portion of a first image of the video image frames with an AR sticker object and a target in operation 402. This may, for example, involve a user selection of an AR object using a touch screen, and placement of the AR object next to a target in the image using the touch screen.

Operation 404 involves generating, based on the user input and the first portion of the first image, a first target template associated with the target. In one embodiment, when a user places an AR object using the touch screen, the image on the screen is processed using a target template pattern to generate a first target template based on the user touch screen input. This pattern and the color values, with any other image values, are used for tracking the target across frames of the video image frames in operation 406. This tracking is done for some or all images following the first image by calculating changes in the first portion of the first image using the first target template. In some embodiments, rather than calculating changes for each frame of video captured and displayed on the device display, only some of the frames may be analyzed, with others processed to add the AR object using various image processing techniques to smoothly insert the AR object into the image data captured by the device.

In operation 408, when the tracking of the target from operation 406 determines that the target is outside a boundary area, global tracking is initiated. Because the target tracking is initiated using a target in an image, at least a first plurality of images of a scene are captured using the target tracking. The global tracking involves using a global tracking template which captures a pattern of data from a different portion of the image frame than the portion captured for target tracking. The global tracking may be considered to track a larger portion of the image frame than the target tracking, and tracks the entire frame for movement, as compared with the target tracking which tracks for movement of the target within the frame. The global tracking begins for images captured following the determination that the target is outside the boundary area. As described above, this may include, in some embodiments, systems with multiple boundaries where both global tracking and target tracking may occur simultaneously, or systems with one boundary that switch back and forth between target tracking and global tracking. In some embodiments, where multiple AR objects are used in different parts of a scene, global tracking may be performed continuously to track different AR objects that may be outside of the captured image at any given time, with targets for AR objects within the image tracked at the same time that global tracking is used to estimate the location of AR objects outside the image.

After an AR object has moved outside of the image in operation 408 with associated global tracking, in operation 410, once a target moves from outside the video frame back inside the video frame, the system resumes tracking the target within the boundary area. When the target moves back into the frame, the device also resumes displaying the AR object on the display based on the tracking of the target.

Figure 5A:
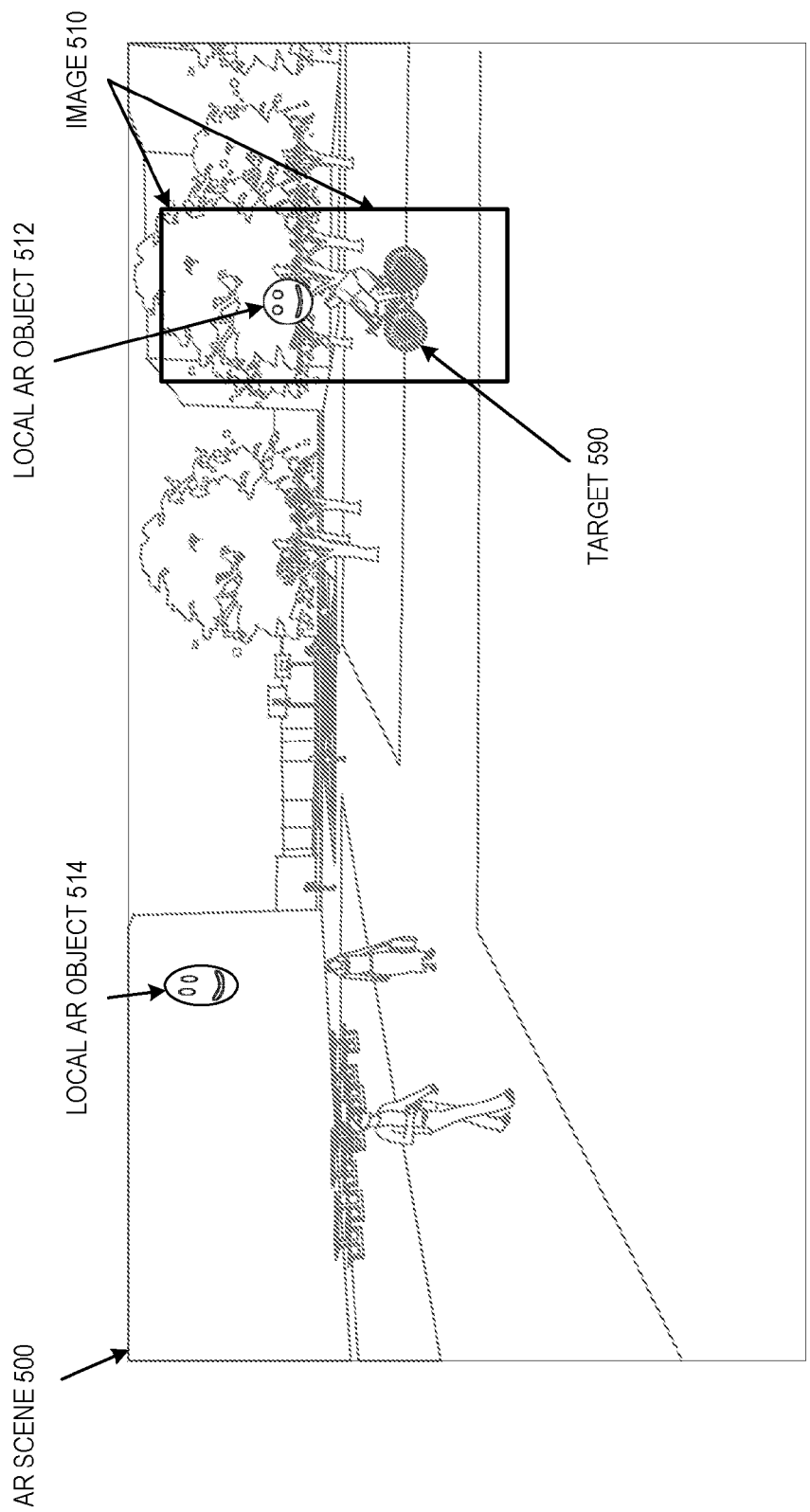
FIG. 5A illustrates aspects of local tracking of augmented reality objects, according to some example embodiments.

FIG. 5A shows an AR scene 500 including real object data of buildings, trees, people, and pathways. The AR scene 500 as illustrated by FIG. 5 represents an environment including elements outside of what is captured by an image sensor of a device at any particular time, and AR object(s) placed within the AR scene 500 by user inputs. As illustrated by FIG. 5A, an image 510 is a portion of the AR scene 500 captured by a single image frame of a device. Previous user or system inputs during operation of an AR system have placed a local AR object 512 and a local AR object 514 in the AR scene 500. The local AR object 512 is associated with a target 590, and is visible within the image 510. The image 510 is the image displayed on the local device with the real object data and the local AR object 512.

Figure 5B:
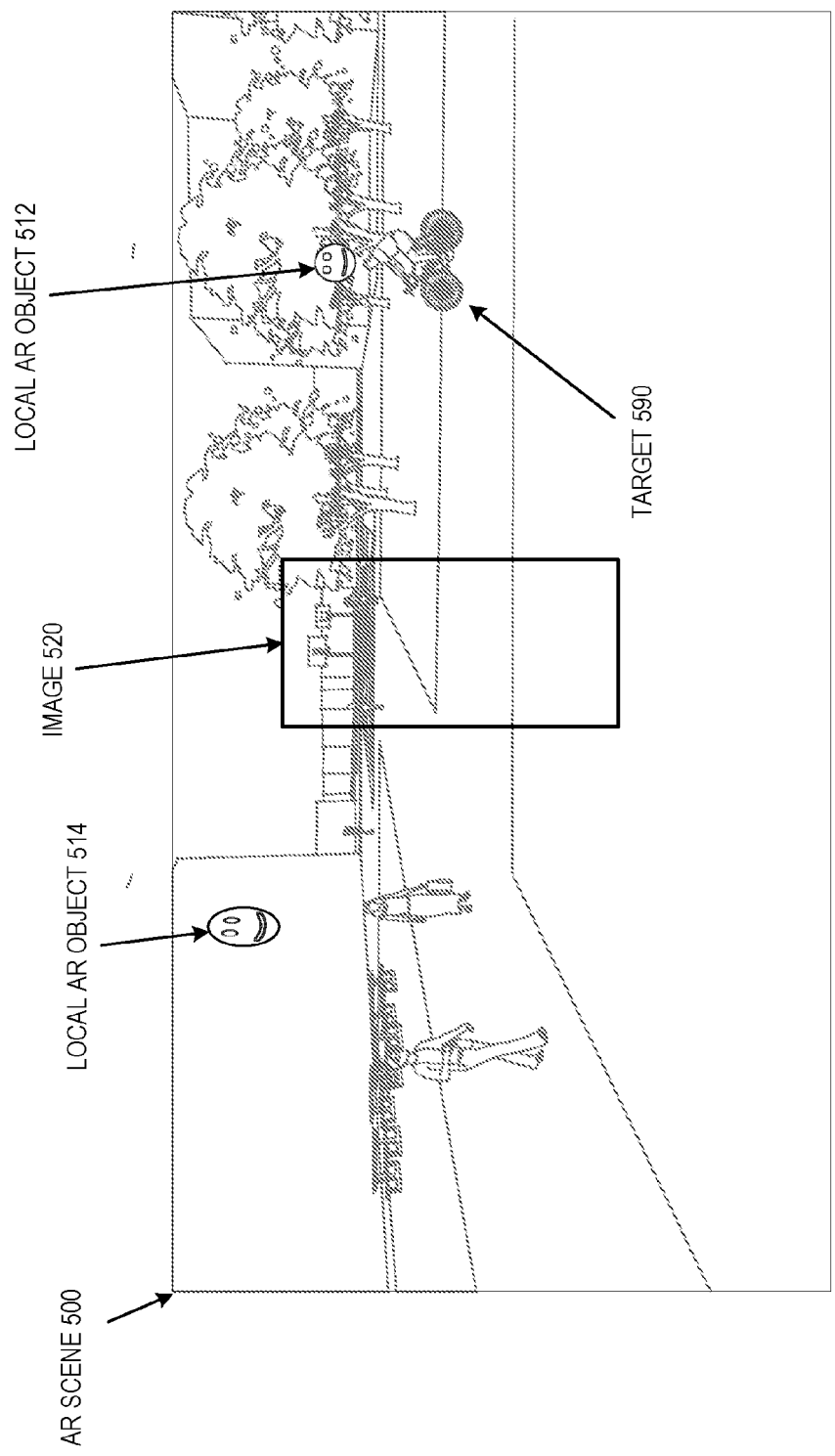
FIG. 5B illustrates aspects of local tracking of augmented reality objects, according to some example embodiments.
Figure 5C:
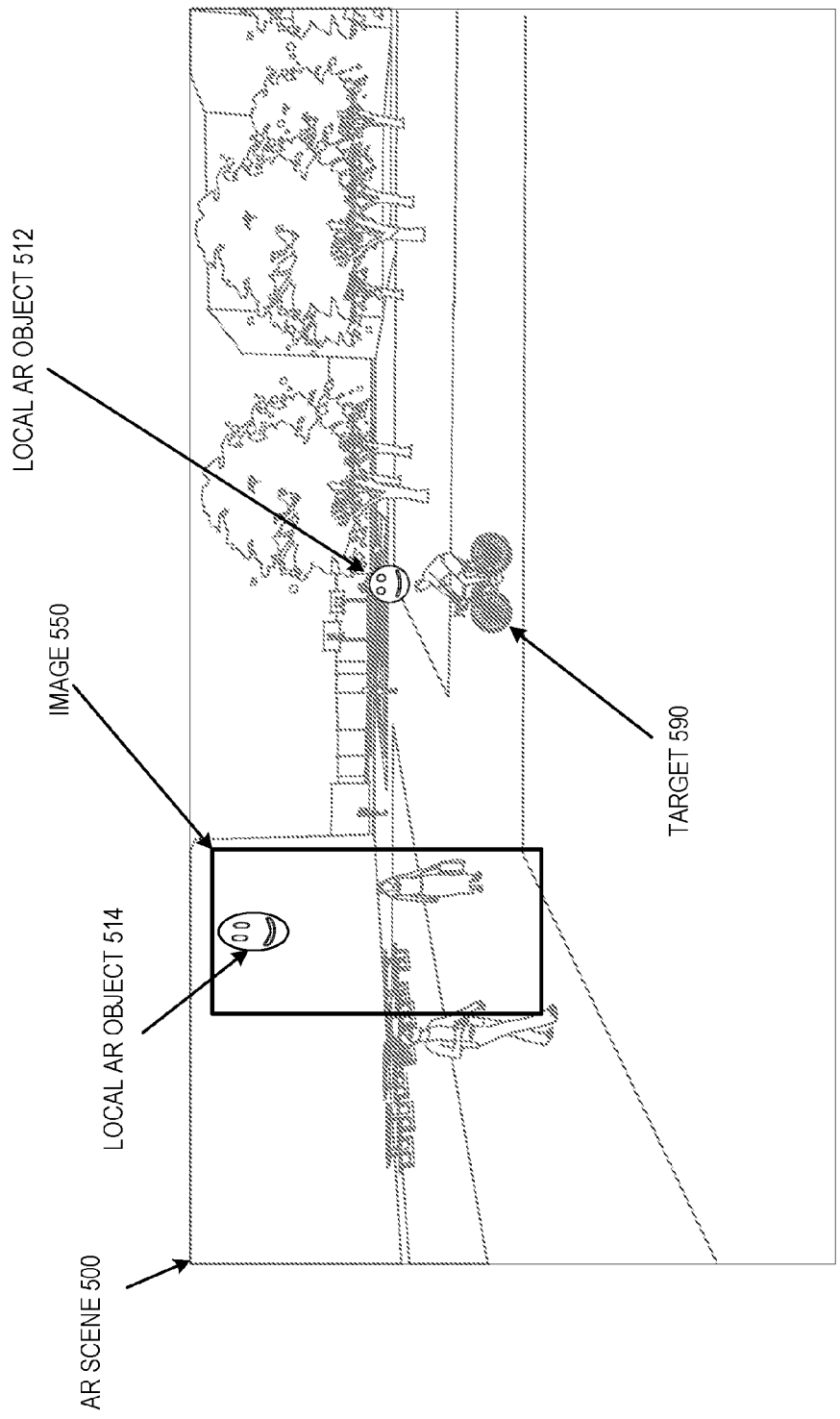
FIG. 5C illustrates aspects of local tracking of augmented reality objects, according to some example embodiments.
Figure 5D:
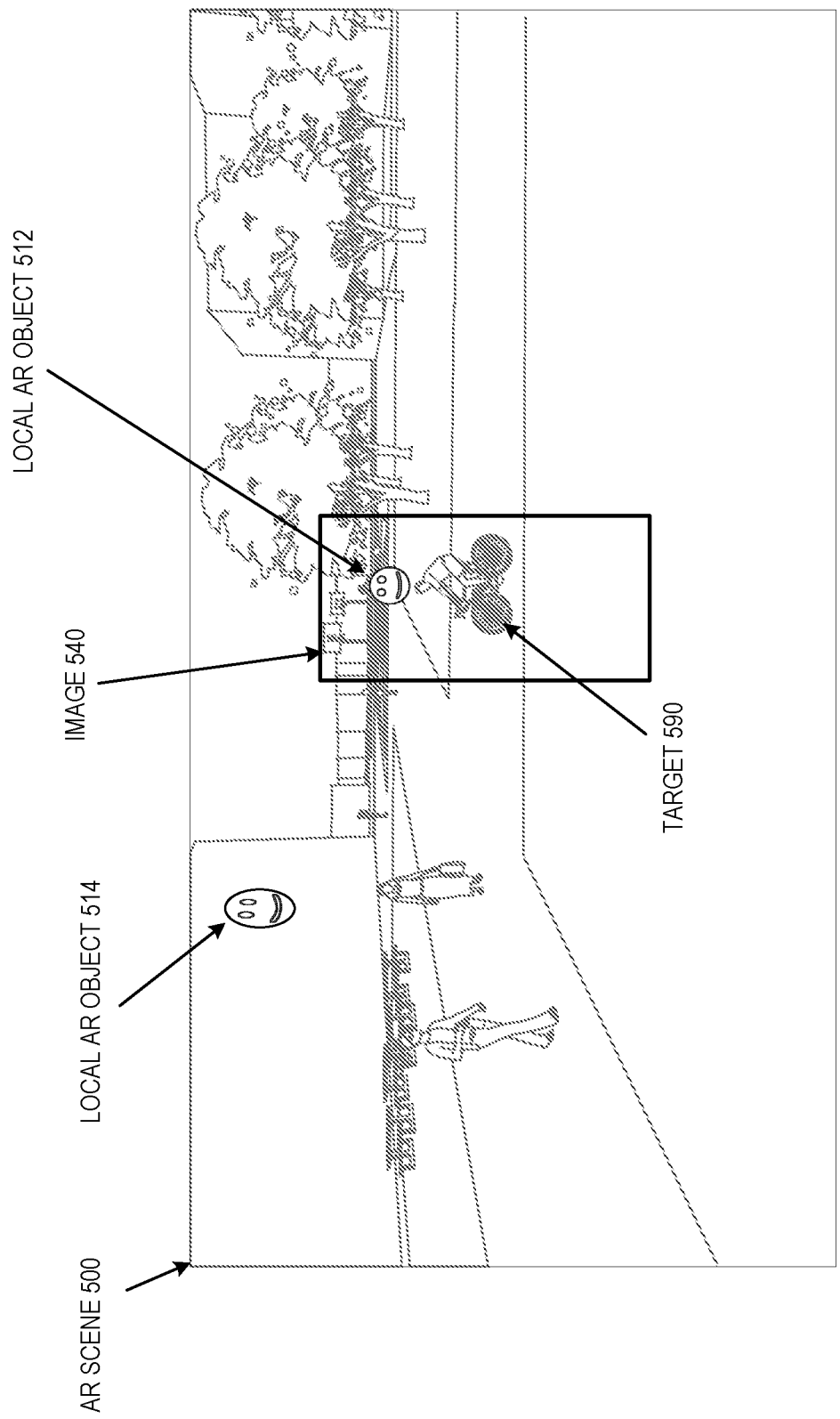
FIG. 5D illustrates aspects of local tracking of augmented reality objects, according to some example embodiments.

As a device user moves the image sensor, in FIG. 5B, an image 520 captured by the device changes. Although the image 520 does not include the local AR object 512 or the local AR object 514, the global tracking that occurs when no AR object is within the image 520 is used to track the position of both the local AR object 514 and the local AR object 512. Because the local AR object 514 is stationary within the AR scene 500, the tracking for this object is simple, and may be based on motion identified in images such as the image 520 and other intermediate images as the portion of the AR scene 500 captured moves from the image 510, to the image 520, to an image 530 of FIG. 5C. These are example images, and it will be apparent that additional images are processed to track the movement of the camera position. In FIG. 5C, the local AR object 514 is within the image 530, and is tracked locally using information from a tracking template created when the local AR object 514 was placed as a "sticker" on the wall in the AR scene 500. As the target 590 moves, a combination of local movement estimation and matching to the template for the target 590 may be used to identify the target 590 in an image 540, shown in FIG. 5D, and to correctly display the local AR object 512 as it is positioned relative to the moving target 590. In some embodiments, for example, the image sensor relative to the background (e.g., the wall that is the target associated with the local AR object 514) may be stable, and a target object such as the target 590 may move through the field of view of the image sensor. In such an embodiment, the AR system may transition from global tracking to local tracking of a target based on movement of the target through the field of view of the camera, and the AR system may transition back to global tracking as the target leaves the field of view of the camera. Thus, the various types of tracking may be modified based on movement of a target within a video frame due to motion of the camera, due to motion of the object without motion of the camera, or both.

Figure 6:
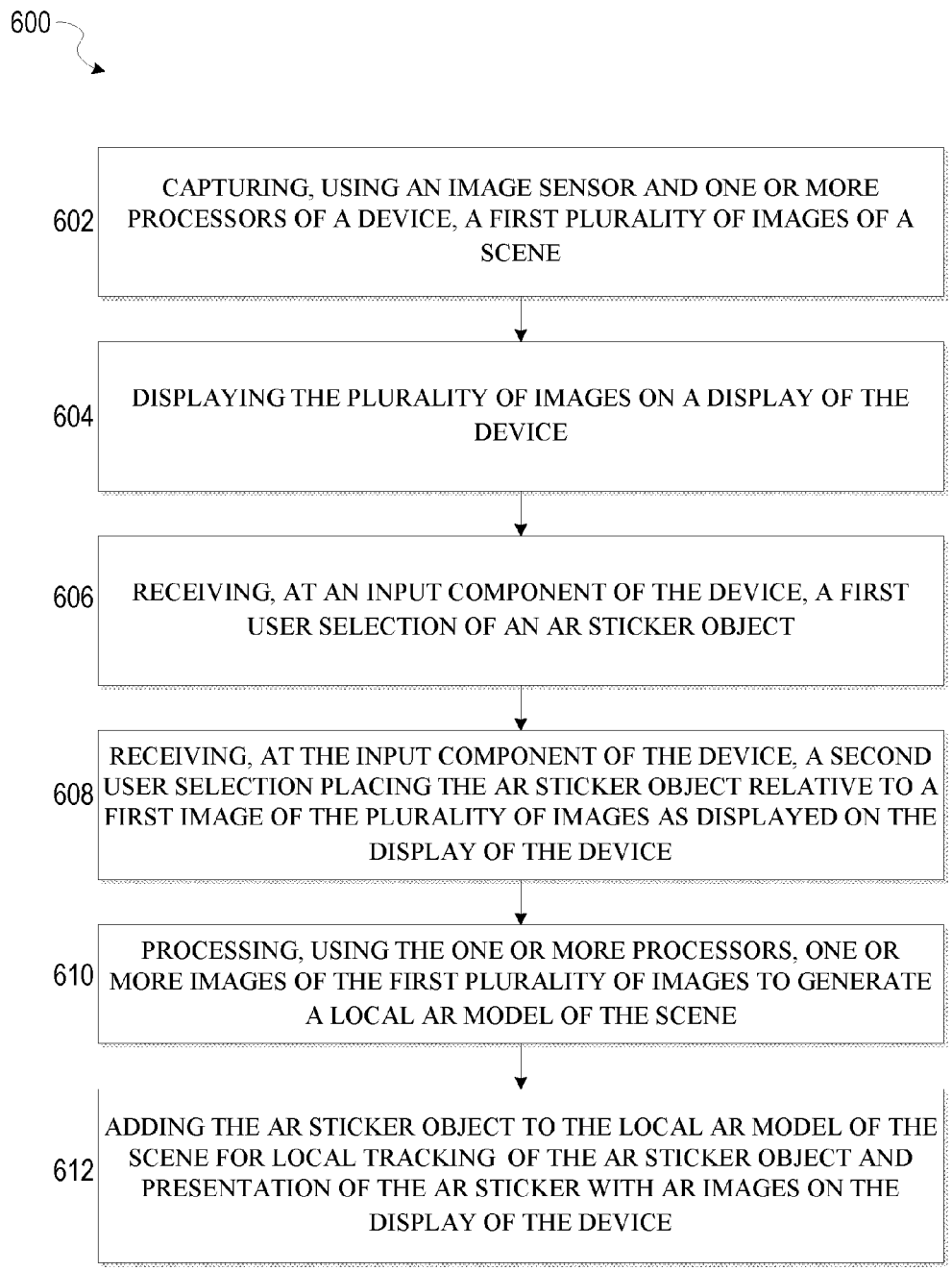
FIG. 6 describes a method for local tracking of augmented reality objects, according to some example embodiments.

FIG. 6 describes a method 600 for local AR tracking. In various embodiments, the method 600 and any other method described herein may be performed by a device, may be implemented as hardware or firmware, or may be instantiated as instructions in a non-transitory computer readable medium that, when executed by one or more processors of a device, cause the device to perform the method 600. Any device such as the client device 110, glasses 51, mobile devices 800 or 900, or machine 1300 may implement the method 600 or any other method described herein.

The method 600 begins at operation 602 with capturing, using an image sensor and one or more processors of a device, a first plurality of images of a scene. In various embodiments, this image capture begins automatically when an AR system begins operating on the device, or may be initiated by a user selection at an interface of an AR system such as the AR system 160. Such AR system operation includes displaying the plurality of images on a display of the device in operation 604. Operation 606 involves receiving, at an input component of the device, a first user selection of an AR sticker object. Operation 608 involves receiving, at the input component of the device, a second user selection placing the AR sticker object relative to a first image of the plurality of images as displayed on the display of the device. Once an AR object is selected at the device in operation 606 and placed within a scene in operation 608, the processors of the device automatically use these inputs to begin generating and outputting images including the captured image data with the AR object integrated into the data and output as an AR image. Thus, in operation 610, the device proceeds with processing, using the one or more processors, one or more images of the first plurality of images to generate a local AR model of the scene. This local AR model of the scene includes a target template for a portion of an image associated with the AR object as placed on an image by the input of operation 608. Once this AR model is generated, operation 612 includes processes for actually adding the AR sticker object to the local AR model of the scene for local tracking of the AR sticker object and presentation of the AR sticker object with AR images on the display of the device. In some embodiments, as the AR model (e.g., a target template) is processed and identified as moving within sequential image frames, additional AR sticker objects may be added, in a second plurality of images of the scene captured by the device, a plurality of AR images using the local AR model of the scene following addition of the additional AR sticker object to the local AR model of the scene may be generated and output on the device display showing multiple AR stickers when they are in the frame captured by the device.

Embodiments may involve displaying a first AR image of the plurality of AR images, wherein the first AR image comprises the AR sticker object; displaying a second AR image of the plurality of AR images following display of the first AR image of the plurality of AR images, wherein the second AR image does not include the AR sticker object, based on a first movement of the image sensor away from a portion of the scene associated with the AR sticker object;

and displaying a third AR image of the plurality of AR images following display of the second AR image of the plurality of AR images, wherein the third AR image comprises the AR sticker object based on a second movement of the image sensor toward the portion of the scene associated with the AR sticker object.

Other embodiments operate by displaying a first AR image of the plurality of AR images, wherein the first AR image comprises the AR sticker object; displaying a second AR image of the plurality of AR images following display of the first AR image of the plurality of AR images, wherein the second AR image does not include the AR sticker object, based on a first change in the scene that results in an AR target object moving out of a field of view of the image sensor; and displaying a third AR image of the plurality of AR images following display of the second AR image of the plurality of AR images, wherein the third AR image comprises the AR sticker object based on a second change in the scene that results in the AR target object moving into the field of view of the image sensor.

The AR model may operate by processing images following the initial image to determine that the target is outside of a boundary area. Based on the determination that the target is outside of the boundary area, sampling a set of global image points may be used to determine an associated movement for a target object not visible within the presented AR image. When the target object moves back into the visible area captured by the image sensor, embodiments may operate by determining, for a final image of a third plurality of images based on the associated movement for the final image and the sampling of the set of global image points for the final image, that the target is within the boundary. Based on the determination that the target is within the boundary, local tracking of the target may resume within the third plurality of images.

FIG. 7 illustrates aspects of a target tracking template with tracking transform 701 used in an AR model of a transition from an image 710 to an image 720. In FIG. 7, a template 712 is a collection of colors sampled at each sample point around a target in the initial image 710. This may be described as:

$$J_i = I_0(s_i); \quad (1)$$

wherein $J_i$ is the target template associated with the AR sticker object, the target template comprising a set of color values sampled at a plurality of sample points $S_i$ associated with the target and a target area in an initial AR model image $I_0$ (image 710) of the one or more images of the first plurality of images.

A transform T(n) then transforms the sample points to different locations in a subsequent frame of a video. The template 712 can be updated with the new frame to reflect the appearance change. In equation 2, function In is tracking an AR sticker object associated with a target in a second plurality of images In received after the initial image may be represented as:

$$J_i^{(l)} = I_n(T(s_i)); \quad (2)$$

where T(n) is a transform describing the movement of the target between sequential images of the second plurality of images analyzed by the one or more processors. In certain embodiments, the AR model may involve local tracking minimizing energy to get an updated transform T(n+1) for a new frame. This need not be done for each frame captured by an image sensor, but for sets of frames that are related to allow tracking using the templates originating from the template 712 including a transformed template 722 and similar templates for every image $I_n$. This may be considered calculating a local tracking energy to determine an updated target template for each of the second plurality of images according to an iterative nonlinear optimization:

$$T_{n+1} = \underset{T_{n+1}}{\arg\min} \sum_i \|I_{n+1}(T_{n+1}(s_i)) - J_i\|^2. \quad (3)$$

This is a nonlinear optimization problem. T(n) may be used as an initial guess for T(n+1). To improve robustness, the updated template from (2) may also be used, as well as a pyramid of previous images, to solve from coarse to fine levels using:

$$T_{n+1} = \underset{T_n}{\arg\min} \, l = 4, 3 \sum_i \|I_{n+1}^{(l)}(T_{n+1}(s_i)) - J_i^{(l)}\|^2; \text{ and} \quad (4)$$

$$T_{n+1} = \underset{T_n}{\arg\min} \, l = 2, 1, 0 \sum_i \|I_{n+1}^{(R)}(T_{n+1}(s_i)) - J_i^{(l)}\|^2. \quad (5)$$

These are used to determine the template associated with each image of the second plurality of images. When the tracked target goes out of a boundary, global tracking is triggered. In some embodiments, this out of boundary state is detected by determining a pixel margin for the target, determining when a center of the target has moved from inside the pixel margin to outside the pixel margin, and initiating global movement tracking of the scene for a third plurality of images following the second plurality of images based on the determination that the center of the target has moved outside the pixel margin. In some embodiments, this out of boundary state is detected when a center of the target transformed template enters the margin within a threshold number of pixels from the edge or boundary of the processed image.

In some embodiments, the global tracking operates using a global template generated by sampling a fixed set of points $\{g_i\}$ within the standard sized image frame generated by the image sensor. The processors are then used to solve for a relative transform $\Delta T$ that minimizes the following:

$$\Delta T = \underset{\Delta T}{\arg\min} \sum_i \|I_{n+1}^{(l)}(\Delta T(g_i)) - I_n^{(l)}\|^2. \quad (6)$$

For robustness, some embodiments may solve previous images on a pyramid from coarse to fine according to:

$$\Delta T = \underset{\Delta T}{\arg\min} \, l = 4, 3, 2, 1, 0 \sum_i \|I_{n+1}^{(l)}(\Delta T(g_i)) - I_n^{(l)}\|^2 \quad (7)$$

to generate a target transform where the target is $$\hat{T}_{n+1} = \Delta T \cdot \hat{T}_n \quad (8)$$

When the implied transform T(n+1) indicates that the target is back in the image, local tracking is resumed. This is detected when the center of the target enters the center area of the image at least a threshold number of pixels from the boundaries. In various embodiments, this process may be enhanced to accommodate moving targets, as described above. Similarly, in some embodiments, modifications may be performed to enable tracking of multiple targets at the same time using one device.

In addition, as described above, various patterns for target templates such as the template 712 may be set based on the AR object selected by a user. The subsequent transformed template(s) 722 calculated by a device to track the target and to place the AR object correctly within an AR image output on a device may similarly be modified based on user selections.

In various embodiments, the AR objects may be various types of objects including two-dimensional objects modified in various ways. For example, calculations may be performed in some embodiments to match façade data from a façade to generate two-dimensional AR objects that match the façade surface, such as shown by the local AR object 514 of FIGS. 5A-5D. In some embodiments, an AR object may simply be a two-dimensional shape associated with a position by the initial placement of the AR object. As the camera moves, regardless of which angle such a two-dimensional sticker object is viewed from, it will always be seen as the same shape in an AR image. Similarly, an emoji sticker object may be used in certain embodiments. In such embodiments, a user may access a simple interface to graphically select an emoji and place the emoji in an image, so that the AR system associates the emoji sticker object with another object in the image or with a set location. If an AR object (e.g local AR object 512) is attached to an object that moves, such as a book, or a space above a person, the AR object may retain a relative position with respect to the attached object or a relative position that is a set space above the attached object.

In some such embodiments, an AR sticker object may be attached to a building or another such object. As a perspective of an AR view changes, the perspective of the AR object changes to maintain the appearance that the AR object is a two-dimensional object "stuck" to the target real object.

In other embodiments, AR objects may be 3D objects, such that an AR object could be a sphere with a face on one side. Another such AR object could be any such 3D version of an emoji, face, animal, or other object. In one embodiment, an AR object could be a 3D tree covered with colored lights in a varying pattern. Any such AR object may also include animations. For example, the lights on the tree could sparkle and blink in different patterns. In some embodiments, the system is able to generate and place an associated two-dimensional "sticker" version of such a 3D AR object. Thus, as described herein, AR objects may include a variety of faces, emoji, animals, custom user-made objects, or any other such possible AR objects. Such AR objects may have associated animations, sounds, transformations, and any other such AR object functionality. This may enable simple generation of a video clip using AR stickers with associated animations, sounds, or other characteristics.

Figure 8:
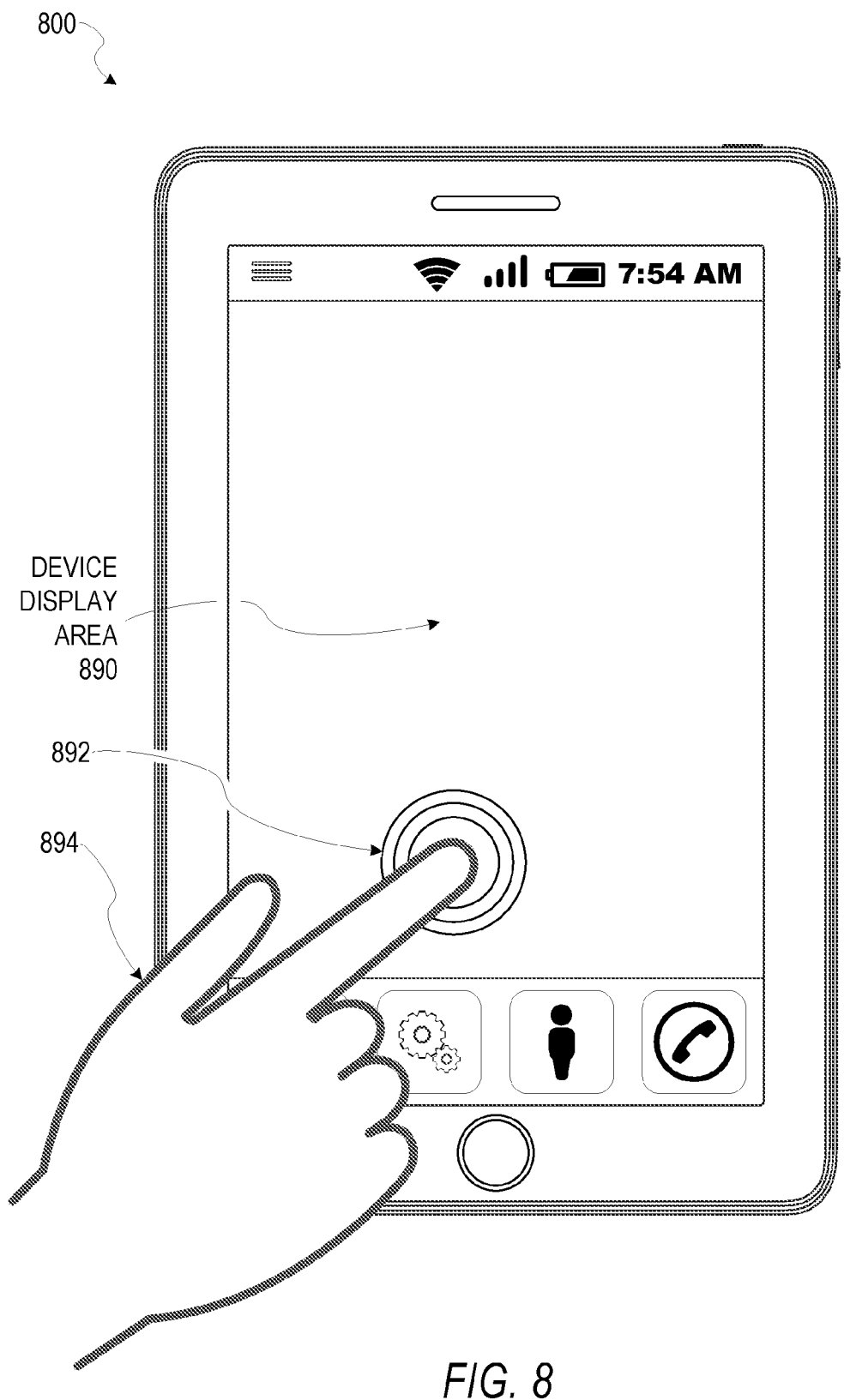
FIG. 8 illustrates aspects of a device that may be used for an augmented reality system, according to some example embodiments.

FIG. 8 illustrates an example mobile device 800 that may be used for an AR system. In such an embodiment, a device display area 890 may present AR images as described herein. Inputs and adjustments to any system operation described herein may be performed using touch screen inputs 892 within the device display area 890 by a user 894.

Figure 9:
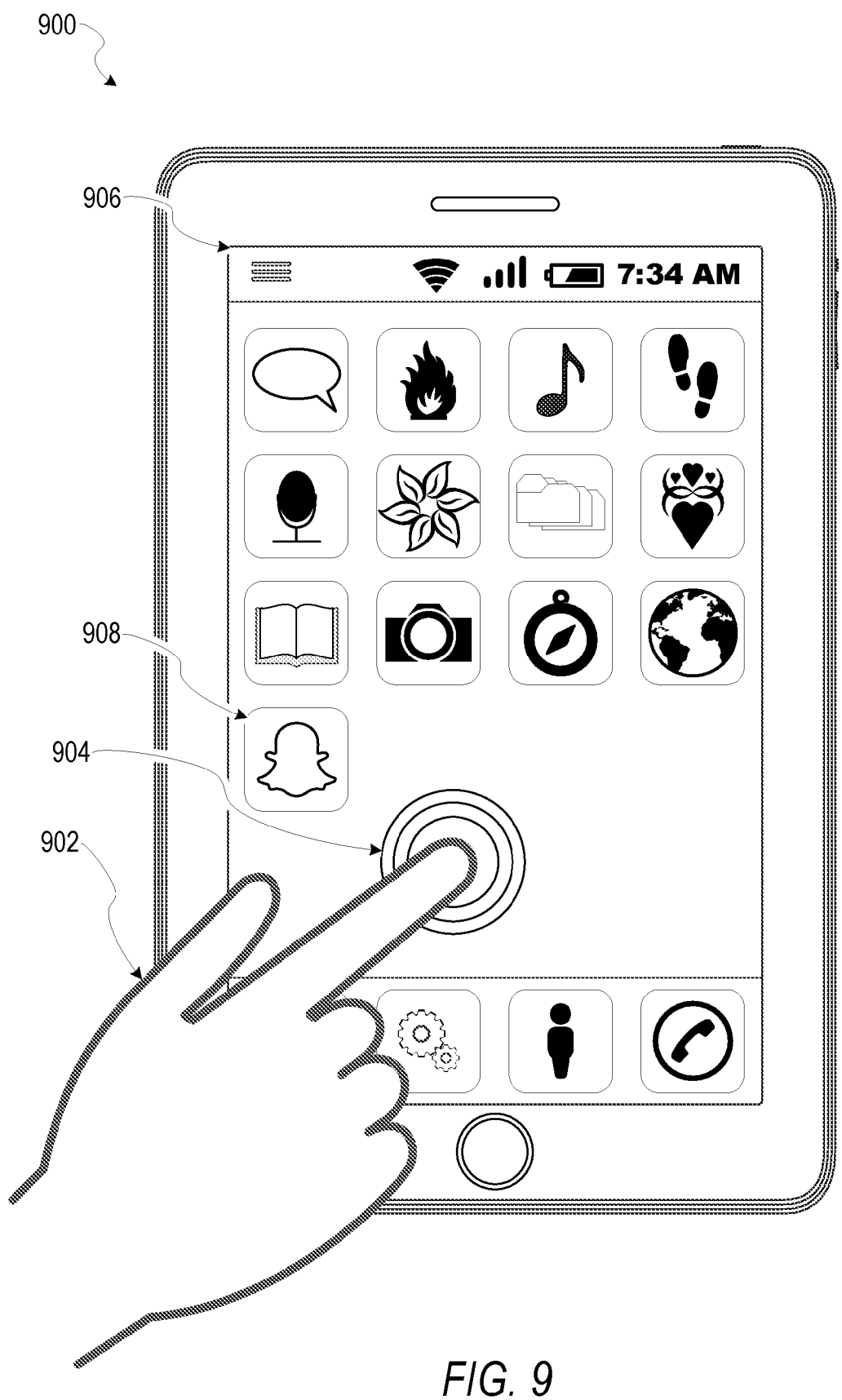
FIG. 9 is a user interface diagram depicting an example mobile device and mobile operating system interface, according to some example embodiments.

FIG. 9 illustrates an example mobile device 900 executing a mobile operating system (e.g., IOS™, ANDROID™, WINDOWS® Phone, or other mobile operating systems), consistent with some embodiments. In one embodiment, the mobile device 900 includes a touch screen operable to receive tactile data from a user 902. For instance, the user 902 may physically touch 904 the mobile device 900, and in response to the touch 904, the mobile device 900 may determine tactile data such as touch location, touch force, or gesture motion. In various example embodiments, the mobile device 900 displays a home screen 906 (e.g., Springboard on IOS™) operable to launch applications or otherwise manage various aspects of the mobile device 900. In some example embodiments, the home screen 906 provides status information such as battery life, connectivity, or other hardware statuses. The user 902 can activate user interface elements by touching an area occupied by a respective user interface element. In this manner, the user 902 interacts with the applications of the mobile device 900. For example, touching the area occupied by a particular icon included in the home screen 906 causes launching of an application corresponding to the particular icon.

Many varieties of applications (also referred to as "apps") can be executed on the mobile device 900, such as native applications (e.g., applications programmed in Objective-C, Swift, or another suitable language running on IOS™, or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 900 includes a social messaging app 908 such as SNAPCHAT® that, consistent with some embodiments, allows users to exchange ephemeral messages that include media content. In this example, the social messaging app 908 can incorporate aspects of embodiments described herein.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). For example, in some embodiments, a device (e.g. a smartphone) determines a first position estimate for the device and captures, by an image sensor of the device, a first image of an environment.

The modules, methods, applications, and so forth described in conjunction with the figures above are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Figure 10:
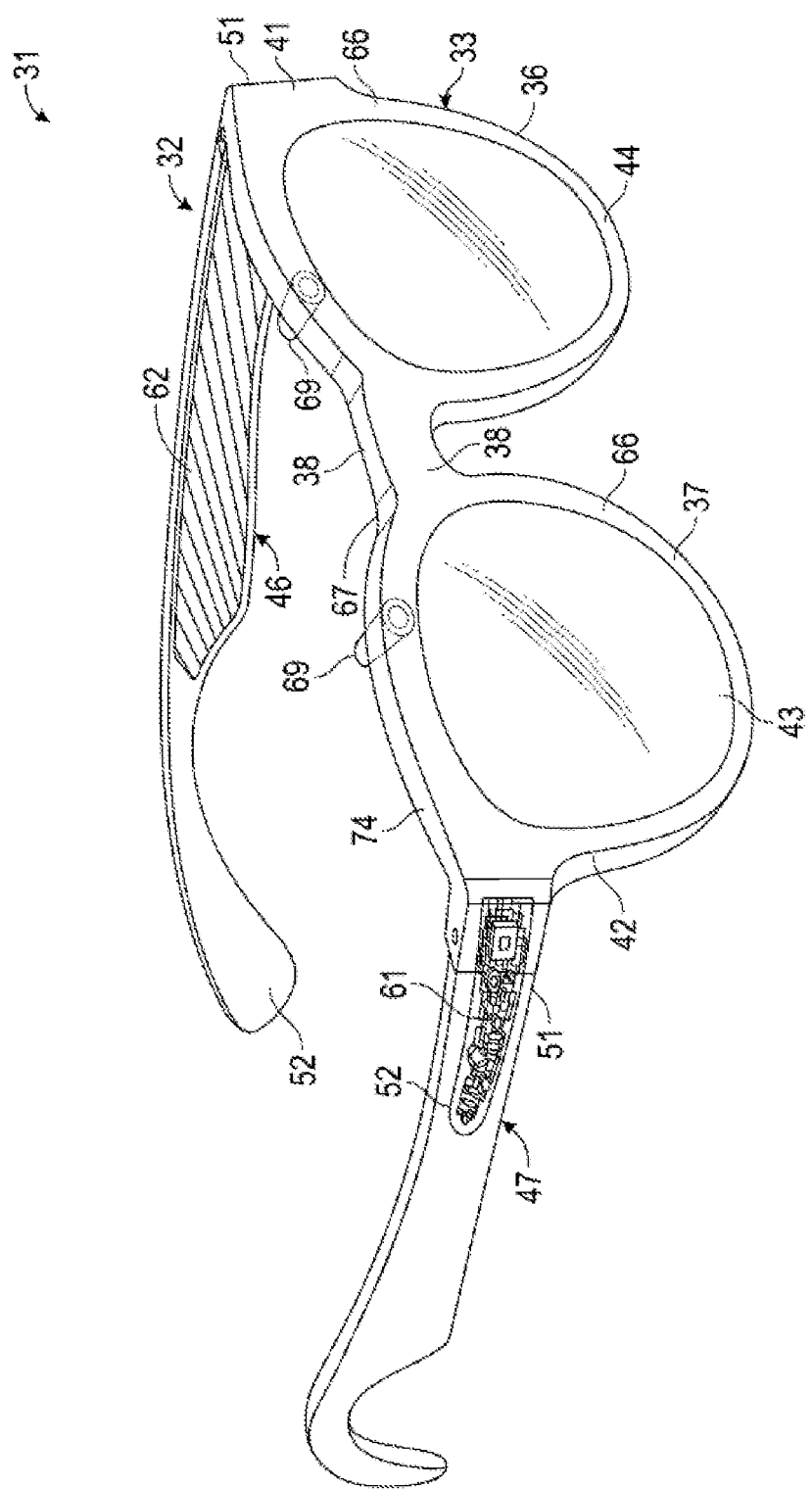
FIG. 10 illustrates an example device that may be used in an augmented reality system, in association with some example embodiments.

FIG. 10 shows aspects of certain embodiments illustrated by a front perspective view of glasses 31. The glasses 31 may, in some embodiments, be a client companion device working in association with and coupled to the client device 110 using wired or wireless (e.g., Bluetooth® or WiFi®) communications. In other embodiments, the glasses 31 may operate as a standalone client device 110 capturing image data and processing the data to add an AR object using local AR object tracking as described herein. The glasses 31 can include a frame 32 made from any suitable material such as plastic or metal, including any suitable shape memory alloy. The frame 32 can have a front piece 33 that can include a first or left lens, display, or optical element holder 36; and a second or right lens, display, or optical element holder 37 connected by a bridge 38. The front piece 33 additionally includes a left end portion 41 and a right end portion 42. A first or left optical element 44 and a second or right optical element 43 can be provided within the respective left and right optical element holders 36 and 37. Each of the optical elements 43 and 44 can be a lens, a display, a display assembly, or a combination of the foregoing. Any of the display assemblies disclosed herein can be provided in the glasses 31.

The frame 32 additionally includes a left arm or temple piece 46 and a right arm or temple piece 47 coupled to the respective left and right end portions 41 and 42 of the front piece 33 by any suitable means such as a hinge (not shown), so as to be coupled to the front piece 33, or rigidly or fixably secured to the front piece 33 so as to be integral with the front piece 33. Each of the temple pieces 46 and 47 can include a first portion 51 that is coupled to the respective end portion 41 or 42 of the front piece 33 and any suitable second portion 52, such as a curved or arcuate piece, for coupling to the ear of the user. In one embodiment, the front piece 33 can be formed from a single piece of material, so as to have a unitary or integral construction.

The glasses 31 can include a computing device, such as a computer 61, which can be of any suitable type so as to be carried by the frame 32 and, in one embodiment of a suitable size and shape, so as to be at least partially disposed in one of the temple pieces 46 and 47. In one embodiment, as illustrated in FIG. 10, the computer 61 has a size and shape similar to the size and shape of one of the temple pieces 46 and 47 and is thus disposed almost entirely if not entirely within the structure and confines of such temple pieces 46 and 47. In one embodiment, the computer 61 can be disposed in both of the temple pieces 46 and 47. The computer 61 can include one or more processors with memory, wireless communication circuitry, and a power source. In certain embodiments, the computer 61 comprises low-power circuitry, high-speed circuitry, and a display processor. Various other embodiments may include these elements in different configurations or integrated together in different ways.

The computer 61 additionally includes a battery 62 or other suitable portable power supply. In one embodiment, the battery 62 is disposed in one of the temple pieces 46 or 47. In the glasses 31 shown in FIG. 11, the battery 62 is shown as being disposed in the left temple piece 46 and electrically coupled using a connection 74 to the remainder of the computer 61 disposed in the right temple piece 47. One or more input and output devices can include a connector or port (not shown) suitable for charging a battery 62 accessible from the outside of the frame 32, a wireless receiver, transmitter or transceiver (not shown), or a combination of such devices.

The glasses 31 include cameras 69. Although two cameras are depicted, other embodiments contemplate the use of a single or additional (i.e., more than two) cameras. In various embodiments, the glasses 31 may include any number of input sensors or peripheral devices in addition to the cameras 69. The front piece 33 is provided with an outward-facing, forward-facing, or front or outer surface 66 that faces forward or away from the user when the glasses 31 are mounted on the face of the user, and an opposite inward-facing, rearward-facing, or rear or inner surface 67 that faces the face of the user when the glasses 31 are mounted on the face of the user. Such sensors can include inward-facing video sensors or digital imaging modules such as cameras that can be mounted on or provided within the inner surface 67 of the front piece 33 or elsewhere on the frame 32 so as to be facing the user, and outward-facing video sensors or digital imaging modules such as the cameras 69 that can be mounted on or provided with the outer surface 66 of the front piece 33 or elsewhere on the frame 32 so as to be facing away from the user. Such sensors, peripheral devices, or peripherals can additionally include biometric sensors, location sensors, or any other such sensors. In additional embodiments, similar elements may be presented as visors, within helmet- or goggle-based systems, in vehicle HUD displays, or in any other such device.

Figure 11:
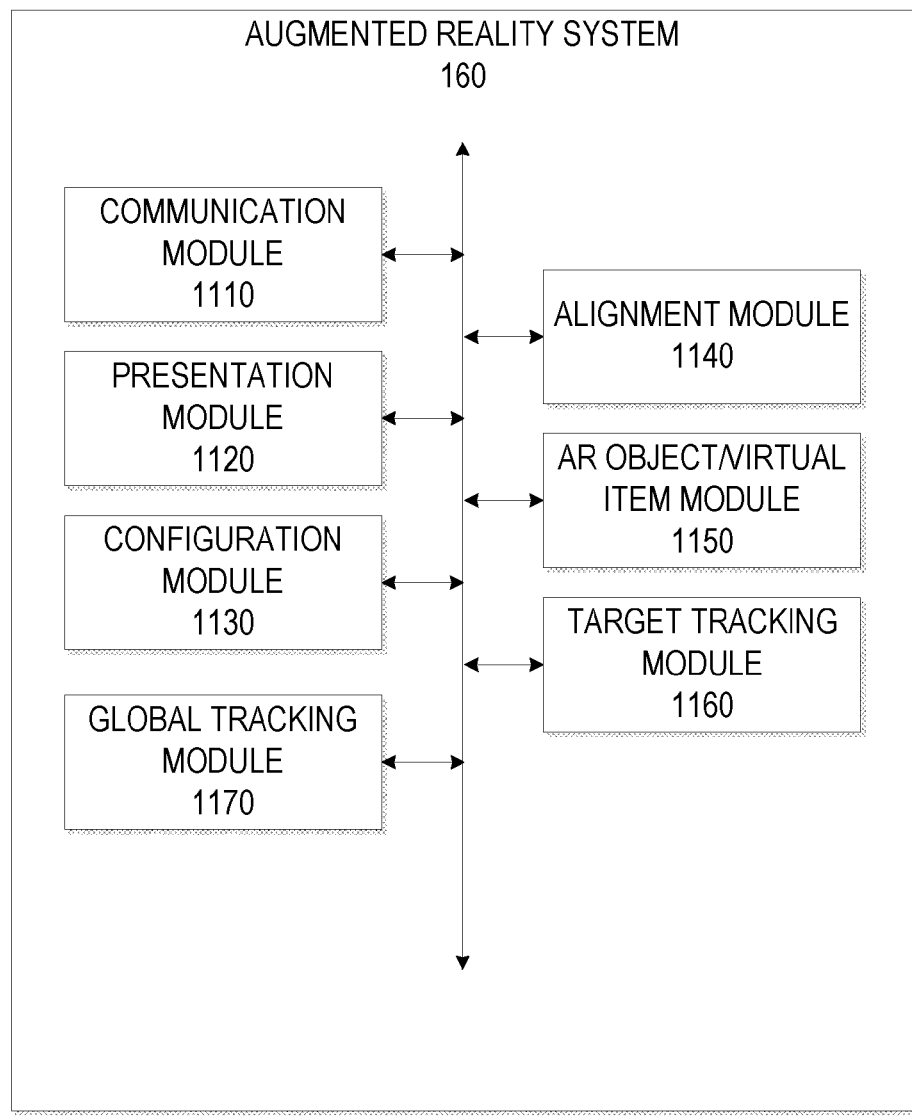
FIG. 11 illustrates an example implementation of a device including processor-implemented modules for local tracking of augmented reality objects, according to some example embodiments.

FIG. 11 is a block diagram 1100 of one embodiment of an AR system 160. The AR system 160 is shown to include a communication module 1110, a presentation module 1120, a configuration module 1130, an alignment module 1140, an AR object/virtual item module 1150, an analysis and target tracking module 1160, and a global tracking module 1170. All, or some, of the modules 1110-1170 communicate with each other, for example, via a network coupling, shared memory, or the like. Each module of the modules of the AR system 160 can be implemented as a single module, combined into other modules, or further subdivided into multiple modules. Other modules not pertinent to example embodiments can also be included, but are not shown.

The communication module 1110 provides various communication functionality. For example, the communication module 1110 receives, accesses, or otherwise obtains image data of an image from a user device. In a specific example, the communication module 1110 receives substantially real-time image data from a camera sensor of a smart phone (e.g., sets of frames or a near-continuous stream of sequential frames captured by a camera sensor of the smart phone). The communication module 1110 exchanges network communications with the database servers 132, the client devices 110, and the third party servers 120. The information retrieved by the communication module 1110 includes data associated with the user (e.g., member profile data from an online account, or social network service data) or other data to facilitate the functionality described herein.

The presentation module 1120 provides various presentation and user interface functionality operable to interactively present and receive information to and from the user. For instance, the presentation module 1120 is used to manage user selection of AR objects and placement of the AR objects within an image of a stream of video frames that associates the AR object with a target. The presentation module 1120 then receives tracking information from the global and target tracking modules 1170 and 1160 to properly present subsequent images captured by the camera with the AR object displayed relative to the associated target in the display of the device. As mentioned above, these images may be presented in real time or near real time, as the images are captured, processed to add virtual objects, and displayed with the virtual objects as quickly as possible. The presentation module 1120 is also utilizable to present user interfaces, selectable AR objects, or any such information for a user interface. In various embodiments, the presentation module 1120 presents or causes presentation of additional information (e.g., by visually displaying information on a screen, acoustic output, haptic feedback). The process of interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors). The presentation module 1120 provides many other user interfaces to facilitate functionality described herein. The terms "presenting" and "displaying" as used herein are intended to include communicating information or instructions to a particular device that is operable to perform presentation based on the communicated information or instructions. This may include both output on a screen and projection of an image onto a user's eye.

The configuration module 1130 may be used to accept and manage user selection of system options. This may include options to select various AR selections, including enabling AR and requesting certain types of AR information to be provided or triggered based on user inputs or input-based triggers. For example, the configuration module 1130 may include a setting provided by a user to automatically present information about certain types of settings related to recording of video clips, communication, image and camera settings, or any other such device setting appropriate to the AR system 160. The configuration module 1130 may also accept user settings to automatically provide direction information in an AR image when direction input triggers are received via the communication module 1110. In other embodiments, any other triggers for implementing image-based location or AR images may be managed by the configuration module 1130. For example, the configuration module 1130 extracts and analyzes candidate shape features or candidate contour characteristics from image data of the image received from the user device (e.g., the client device 110) when a system includes such analysis as a trigger for display of AR images. The configuration module 1130 determines satisfaction of various rules or criteria associated with the extracted candidate shape features. The configuration module 1130 compares the extracted candidate shape features with reference shape features of a custom graphic or another reference image. The configuration module 1130 can employ a wide variety of schemes and techniques to extract candidate shape features from the image data of the image and subsequently trigger display of AR images.

The alignment module 1140 provides image processing functionality to determine and verify an alignment of the image data captured by an image sensor and the virtual objects placed into the image. This may include managing of multiple AR objects being tracked simultaneously by the modules 1160 and 1170, or determining when movement of the camera or target objects exceeds a threshold to allow local AR object tracking with reasonable error. For example, blur values measured in frames of a video image may be measured to determine that the global tracking of an AR object is insufficiently precise. Such a measurement or threshold comparison may present an alert to a user, and may automatically disable the presentation of one or more AR objects in subsequent frames of an ongoing AR output. In some embodiments, the alignment module 1140 may access or generate a computer model of the environment, including various templates described herein and tracked by the modules 1160 and 1170, and may use the computer model to insert virtual items into an image based on the computer model of the environment. In some embodiments, alignment module 1140 may perform threshold or rule checks to verify that virtual items displayed in AR images meet certain quality metrics to provide an acceptable user experience. This may include verifying that a virtual object does not move in unexpected ways with respect to objects in an image, that images captured by an image sensor are sufficiently stable over time to enable AR functions, or other such metrics. In some embodiments, the alignment module 1140 extracts spatial attributes from the image data. In various embodiments, the spatial attributes include at least one of position, orientation, scale, or other spatial aspects of objects in images. The alignment module 1140 determines an alignment of the image objects based on the spatial attributes (e.g., a particular orientation). In an example, the alignment module 1140 can determine an alignment including position and orientation based on the spatial attributes and generate a transformed image according to the alignment.

The AR object/virtual item module 1150 provides functionality to generate images associated with virtual items. In some embodiments, this may include graphics information related to virtual location markers, virtual direction arrows, or virtual items or objects. In some embodiments, this may include graphics information for inserting mobile virtual objects into video (e.g., virtual animals, robots, dinosaurs, video display, etc.). In some embodiments, for each virtual object, presentation rules may be stored in the AR object/virtual item module 1150 and used by other modules to verify that virtual objects may be inserted into image data with sufficient output quality.

The target tracking module 1160 provides analysis of data from an image sensor associated with specific targets identified by user inputs as described herein. The target tracking module 1160 may both track targets present within a sequence of images, and may search images where a target is not present to determine if the target has moved into an unexpected image. Such operations may include image processing operations to identify key points in an image and to match target data against portions of an image to identify a match. Additionally, when a target may change over time when out of the image frame, the target tracking module 1160 may modify the criteria for a target match based on expected changes in the target. For example, if a target is a face, the target tracking module may process images for alternate perspectives of the target face (e.g., profile images where the initial target view was directly into the face). This tracking by the target tracking module 1160 may further be modified by information from the global tracking module 1170. For example, when the global tracking module 1170 identifies that the image frame has moved away from the position of the target, the tracking performed by the target tracking module 1160 may be limited or stopped, particularly if the target is expected to be stationary. As the global tracking module 1170 identifies that the image frame has moved into an area where an edge of the target may come into the image, the target tracking module 1160 may increase analysis of images to identify the target or a portion of the target.

The global tracking module 1170 processes elements of an image unrelated to a particular target as described herein, and may also provide movement information related to scene backgrounds and camera movement to other modules. In some embodiments, processing from the global tracking module 1170 may be used to generate an AR model of a scene. This may be done, for example, by using a global tracking template that stores information from video frames to generate a local model of the scene being captured. In some embodiments, this information may be stored and reused between image capture operations. In other embodiments, this information is deleted whenever a device exits an AR mode, such that the global tracking template and AR model begins with no data when the AR mode is entered and the camera device begins capturing data.

Figure 12:
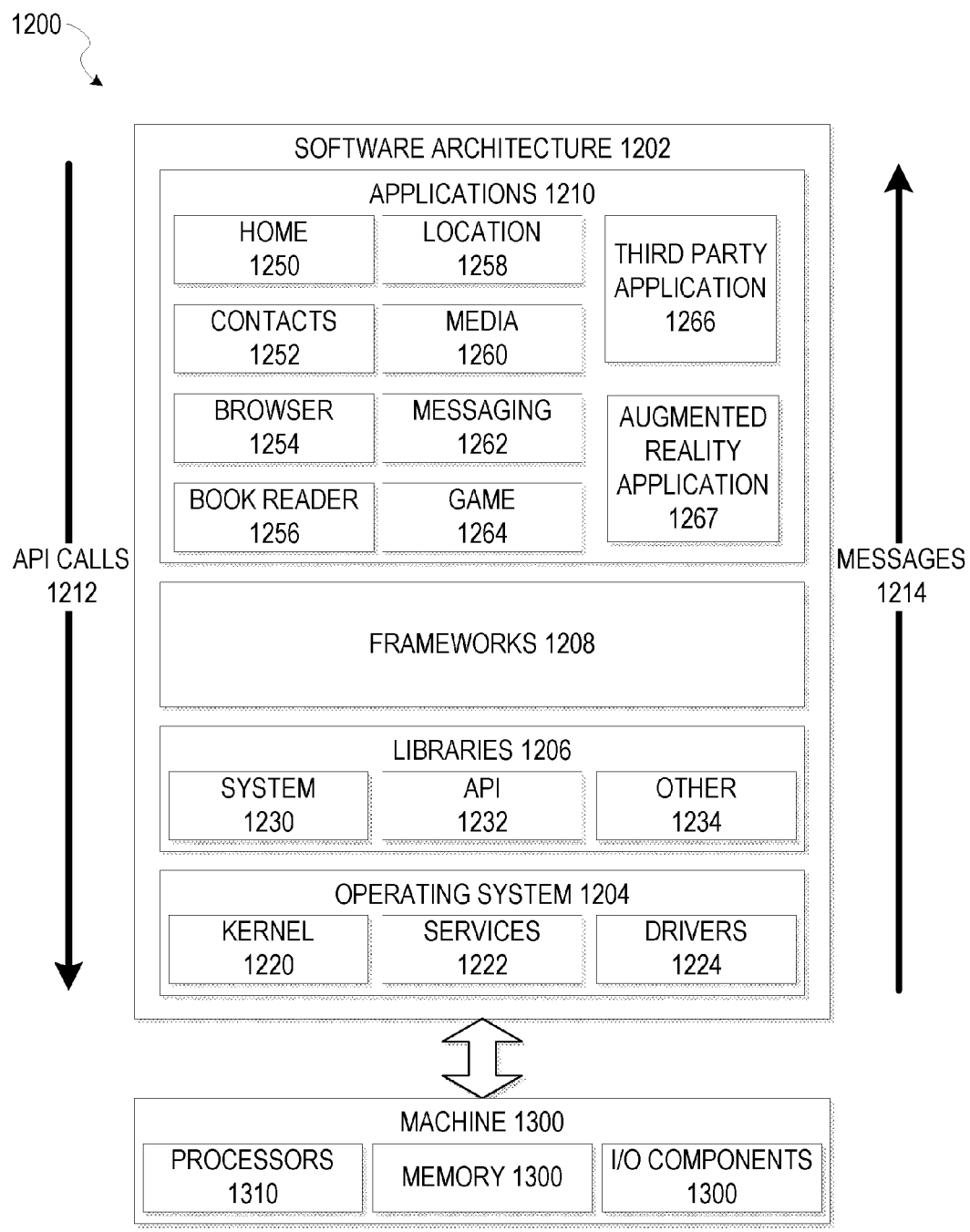
FIG. 12 is a block diagram illustrating an example of a software architecture that may be installed on a machine, according to some example embodiments.

FIG. 12 is a block diagram 1200 illustrating an architecture of software 1202, which can be installed on any one or more of the devices described above. FIG. 12 is merely a non-limiting example of a software architecture, and it will be appreciated that many other architectures can be implemented to facilitate the functionality described herein. In various embodiments, the software 1202 is implemented by hardware such as a machine 1300 of FIG. 13 that includes processors 1310, memory 1330, and input/output (I/O) components 1350. In this example architecture, the software 1202 can be conceptualized as a stack of layers where each layer may provide a particular functionality. For example, the software 1202 includes layers such as an operating system 1204, libraries 1206, frameworks 1208, and applications 1210. Operationally, the applications 1210 invoke API calls 1212 through the software stack and receive messages 1214 in response to the API calls 1212, consistent with some embodiments. In one example, the AR system 160 operates as an application 1210.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG 4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party application 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third party application 1266 can invoke the API calls 1212 provided by the operating system 1204 to facilitate functionality described herein.

An AR application 1267 may implement any system or method described herein, including local AR object placement, presentation on an output display, and AR video recording. Further, in some embodiments, the messaging application 1262 and the AR application 1267 may operate together as part of an ephemeral messaging application. Such an ephemeral messaging application may operate to generate images, allow users to add AR elements to the images, and communicate some or all of the images and/or AR data to another system user. After a deletion trigger has been met, the sent data is deleted from the receiving user's system, and the images and/or AR data may also be synchronized to be deleted from any server involved in communication of the ephemeral message that included the image and/or the AR data. In some embodiments, the trigger for deletion of data from a receiving user's device may be a timer that indicates how long an AR image is displayed for. In other embodiments, the ephemeral messaging system may have set date and time triggers for deletion, or deletion associated with a number of times that a receiving user has accessed the data.

For example, in one embodiment, a user may send a video clip including an AR object captured using local AR tracking as described herein. A user may select an ephemeral or non-ephemeral status for such a message including AR data, such that a non-ephemeral message including the data will wait for a selection from a receiving user to delete the AR data, and the AR data that is part of the message may be stored on a communication server indefinitely.

Figure 13:
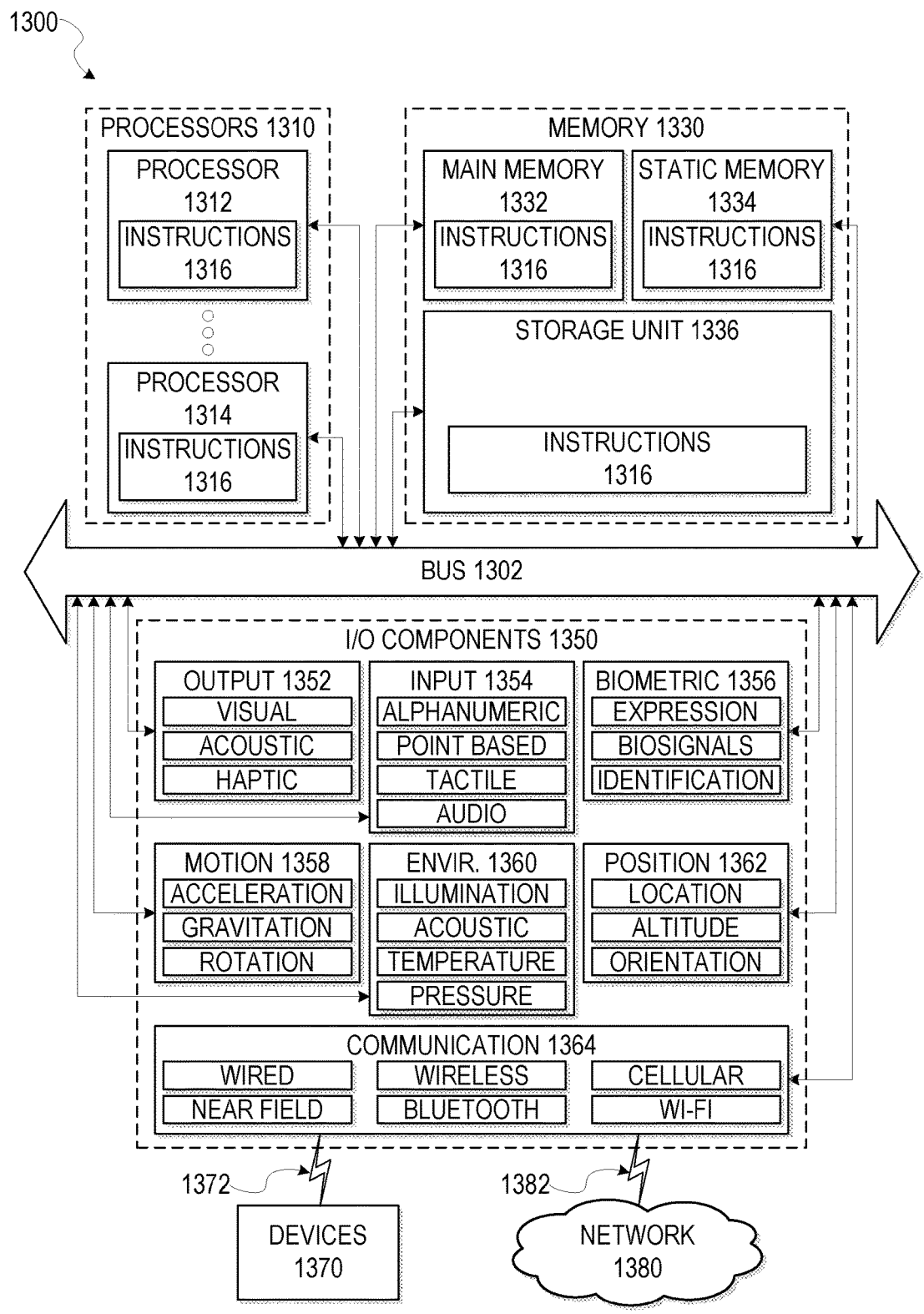
FIG. 13 is a block diagram presenting a diagrammatic representation of a machine in the form of a computer system within which a set of instructions may be executed for causing the machine to perform any of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein can be executed. Additionally, or alternatively, the instruction can implement any module of FIG. 1, FIG. 11, and so forth. The instructions transform the general, non-programmed machine into a particular machine programmed to carry out the described and illustrated functions in the manner described. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 can include processors 1310, memory/storage 1330, and I/O components 1350, which can be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1312 and a processor 1314 that may execute the instructions 1316. The term "processor" is intended to include multi-core processor that may comprise two or more independent processors (sometimes referred to as "cores") that can execute instructions contemporaneously. Although FIG. 13 shows multiple processors, the machine 1300 may include a single processor with a single core, a single processor with multiple cores (e.g., a multi-core processor), multiple processors with a single core, multiple processors with multiples cores, or any combination thereof.

The memory/storage 1330 can include a main memory 1332, a static memory 1334, or other memory storage, and a storage unit 1336, all accessible to the processors 1310 such as via the bus 1302. The storage unit 1336, static memory 1334, and main memory 1332 store the instructions 1316 embodying any one or more of the methodologies or functions described herein. The instructions 1316 can also reside, completely or partially, within the main memory 1332, within the static memory 1334, within the storage unit 1336, within at least one of the processors 1310 (e.g., within the processor's cache memory), or any suitable combination thereof, during execution thereof by the machine 1300. Accordingly, the main memory 1332, the static memory 1334, the storage unit 1336, and the memory of the processors 1310 are examples of machine-readable media.

As used herein, the term "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 can include a wide variety of components to receive input, provide output, produce output, transmit information, exchange information, capture measurements, and so on. The specific I/O components 1350 that are included in a particular machine will depend on the type of machine. For example, portable machines such as mobile phones will likely include a touch input device or other such input mechanisms, while a headless server machine will likely not include such a touch input device. It will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 can include output components 1352 and input components 1354. The output components 1352 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1350 can include biometric components 1356, motion components 1358, environmental components 1360, or position components 1362 among a wide array of other components. For example, the biometric components 1356 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 can include acceleration sensor components (e.g., an accelerometer), gravitation sensor components, rotation sensor components (e.g., a gyroscope), and so forth. The environmental components 1360 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or other suitable device to interface with the network 1380. In further examples, the communication components 1364 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a USB).

Moreover, the communication components 1364 can detect identifiers or include components operable to detect identifiers. For example, the communication components 1364 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1316 can be transmitted or received over the network 1380 using a transmission medium via a network interface device (e.g., a network interface component included in the communication components 1364) and utilizing any one of a number of well-known transfer protocols (e.g., HTTP). Similarly, the instructions 1316 can be transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method for local augmented reality (AR) tracking, the method comprising:
   capturing, using an image sensor and one or more processors of a device, a first plurality of images of a scene;
   displaying the first plurality of images on a display of the device;
   receiving, at an input component of the device, a first user selection of an AR sticker object;
   receiving, at the input component of the device, a second user selection placing the AR sticker object relative to a first image of the first plurality of images as displayed on the display of the device;
   processing, using the one or more processors, one or more images of the first plurality of images to generate a local AR model of the scene; and
   adding the AR sticker object to the local AR model of the scene for local tracking of the AR sticker object and presentation of the AR sticker object with AR images on the display of the device, wherein adding the AR sticker object to the local AR model of the scene for local tracking of the AR sticker object comprises:
identifying a target template associated with the AR sticker object described by $J_i=I_0(s_i)$;
wherein $J_i$ is the target template associated with the AR sticker object, the target template comprising a set of color values sampled at a plurality of sample points $S_i$ associated with a target and a target area in an initial AR model image $I_0$ of the one or more images of the first plurality of images and i is an integer set.

2. The method of claim 1 further comprising:
capturing, using the image sensor, a second plurality of images of the scene; and
generating, using the one or more processors, a second plurality of AR images using the local AR model of the scene following addition of the AR sticker object to the local AR model of the scene.

3. The method of claim 2 further comprising:
displaying a first AR image of the plurality of AR images, wherein the first AR image comprises the AR sticker object;
displaying a second AR image of the plurality of AR images following display of the first AR image of the plurality of AR images, wherein the second AR image does not comprise the AR sticker object, based on a first movement of the image sensor away from a portion of the scene associated with the AR sticker object; and
displaying a third AR image of the plurality of AR images following display of the second AR image of the plurality of AR images, wherein the third AR image comprises the AR sticker object based on a second movement of the image sensor toward the portion of the scene associated with the AR sticker object.

4. The method of claim 2 further comprising:
displaying a first AR image of the plurality of AR images, wherein the first AR image comprises the AR sticker object;
displaying a second AR image of the plurality of AR images following display of the first AR image of the plurality of AR images, wherein the second AR image does not comprise the AR sticker object, based on a first change in the scene that results in an AR target object moving out of a field of view of the image sensor; and
displaying a third AR image of the plurality of AR images following display of the second AR image of the plurality of AR images, wherein the third AR image comprises the AR sticker object based on a second change in the scene that results in the AR target object moving into the field of view of the image sensor.

5. The method of claim 1 wherein the local AR model is generated in response to the placement of the AR sticker object.

6. The method of claim 1 wherein processing the one or more images of the first plurality of images to generate the local AR model of the scene comprises:
identifying, based on the placement of the AR sticker object, a target within the first image of the first plurality of images; and
tracking movement of the target within subsequent images captured by the image sensor.

7. The method of claim 6 wherein processing the one or more images of the first plurality of images to generate the local AR model of the scene further comprises:
processing a second image of the subsequent images to determine that the target is outside of a boundary area; and
based on the determination that the target is outside of the boundary area, for a third plurality of images captured by the image sensor after the determination that the target is outside the boundary area:
for each image of the third plurality of images, sampling a set of global image points; and
determining an associated movement.

8. The method of claim 7 further comprising:
determining, for a final image of the third plurality of images based on the associated movement for the final image and the sampling of the set of global image points for the final image of the third plurality of images, that the target is within the boundary; and
based on the determination that the target is within the boundary, tracking the target within a fourth plurality of images that follow the third plurality of images.

9. The method of claim 1 further comprising tracking the AR sticker object by:
processing a second plurality of images in received after the initial AR model image such that:

$$J_i^{(l)}=I_n(T(s_i))$$

where T(n) is a transform describing movement of the target between sequential images of the second plurality of images analyzed by the one or more processors for integer set n and integer set l; and
calculating a local tracking energy to determine an updated target template for each image of the second plurality of images according to an iterative nonlinear optimization:

$$T_{n+1} = \arg\min_{T_{n+1}} \sum_i \|I_{n+1}(T_{n+1}(s_i)) - J_i\|^2; \text{ such that}$$

$$T_{n+1} = \arg\min_{T_n} 1 = 4, 3 \sum_i \|I_{n+1}^{(l)}(T_{n+1}(s_i)) - J_i^{(l)}\|^2; \text{ and}$$

$$T_{n+1} = \arg\min_{T_n} 1 = 2, 1, 0 \sum_i \|I_{n+1}^{(R)}(T_{n+1}(s_i)) - J_i^{(l)}\|^2$$

are used to determine the updated target template associated with each image of the second plurality of images.

10. The method of claim 9, further comprising:
determining a pixel margin for the target;
determining when a center of the target has moved from inside the pixel margin to outside the pixel margin; and
initiating a global movement tracking of the scene for a third plurality of images following the second plurality of images based on the determination that the center of the target has moved outside the pixel margin.

11. The method of claim 10 wherein the center of the target is identified by a center pixel of the target template moving to within a set number of pixels from an edge of a trigger image, wherein the set number of pixels is associated with the pixel margin.

12. The method of claim 11 wherein the global movement tracking comprises:
sampling a fixed set of points g within each image of the third plurality of images following the initiation of the global movement tracking; and calculating a transform $\Delta T$ to estimate a minimum value for:

$$\Delta T = \underset{\Delta T}{\arg\min} \sum_i \|I_{n+1}^{(l)}(\Delta T(g_i)) - I_n^{(l)}\|^2.$$

13. The method of claim 12 wherein the minimum value is estimated using:

$$\underset{\Delta T}{\arg\min} \, 1 = 4, 3, 2, 1, 0 \sum_i \|I_{n+1}^{(l)}(\Delta T(g_i)) - I_n^{(l)}\|^2$$

to generate a target transform where:

$$\hat{T}_{n+1} = \Delta T \cdot \hat{T}_n.$$

14. A device comprising:
a display;
an input component coupled to the display;
a memory coupled to the display and the input component;
an image sensor; and
one or more processors coupled to the display, the image sensor, the input component, and the memory, the one or more processors configured to process video image frames captured by the image sensor and output local AR images using local AR tracking of an AR sticker object by:
processing a user input associating a first portion of a first image of the video image frames with the AR sticker object and a target;
generating, based on the user input and the first portion of the first image, a first target template associated with the target;
tracking the target across frames of the video image frames following the first image by calculating changes in the first portion of the first image using the first target template;
initiating a global tracking based on a determination that the target is outside a boundary area the global tracking comprising using a global tracking template for tracking movement in the video image frames captured following the determination that the target is outside the boundary area; and
resuming tracking the target when the global tracking determines that the target is within the boundary area, and displaying the AR sticker object on the display based on the tracking of the target;
wherein tracking the target across the frames of the video image frames following the first image by calculating the changes in the first portion of the first image using the first target template comprises:
identifying the first target template associated with the AR sticker object described by $J_i = I_0(s_i)$;
wherein $J_i$ is the first target template associated with the AR sticker object for integer set i, the first target template comprising a set of color values sampled at a plurality of sample points $S_i$ associated with the target and a target area in an initial AR model image $I_0$ of one or more images of the first plurality of images.

15. The device of claim 14 further comprising tracking the AR sticker object by:

processing a second plurality of images $I_n$ received after the initial AR model image such that:

$$J_i^{(l)} = I_n(T(s_i))$$

where T(n) is a transform describing movement of the target between sequential images of the second plurality of images analyzed by the one or more processors; and
calculating a local tracking energy to determine an updated target template for each image of the second plurality of images according to an iterative nonlinear optimization:

$$T_{n+1} = \underset{T_{n+1}}{\arg\min} \sum_i \|I_{n+1}(T_{n+1}(s_i)) - J_i\|^2; \text{ such that}$$

$$T_{n+1} = \underset{T_n}{\arg\min} \, 1 = 4, 3 \sum_i \|I_{n+1}^{(l)}(T_{n+1}(s_i)) - J_i^{(l)}\|^2; \text{ and}$$

$$T_{n+1} = \underset{T_n}{\arg\min} \, 1 = 2, 1, 0 \sum_i \|I_{n+1}^{(R)}(T_{n+1}(s_i)) - J_i^{(l)}\|^2$$

are used to determine the updated target template associated with each image of the second plurality of images for integer sets n and I.

16. A non-transitory computer readable medium comprising instructions that, when performed by one or more processors of a device, cause the device to perform a method comprising:
processing a user input associating a first portion of a first image of video image frames captured by an image sensor with an AR sticker object and a target;
generating, based on the user input and the first portion of the first image, a first target template associated with the target; and
tracking the target across frames of the video image frames following the first image by calculating changes in the first portion of the first image using the first target template by identifying a target template associated with the AR sticker object described by $J_i = I_0(s_i)$;
wherein $J_i$ is the target template associated with the AR sticker object, the target template comprising a set of color values sampled at a plurality of sample points $S_i$ associated with a target and a target area in an initial AR model image $I_0$ of the one or more images of the first plurality of images and i is an integer set.

17. The non-transitory computer readable medium of claim 16 wherein the method performed by the one or more processors of the device further comprises:
initiating a global tracking based on a determination that the target is outside a boundary area the global tracking comprising using a global tracking template for tracking movement in the video image frames captured following the determination that the target is outside the boundary area; and
resuming tracking the target when the global tracking determines that the target is within the boundary area.

18. The non-transitory computer readable medium of claim 17 wherein tracking the target across the frames of the video image frames following the first image by calculating the changes in the first portion of the first image using the first target template further comprises:
tracking the AR sticker object by processing a second plurality of images $I_n$ received after the initial AR model image such that:

$$J_i^{(l)} = I_0(T(s_i))$$

where T(n) is a transform describing movement of the target between sequential images of the second plurality of images analyzed by the one or more processors; and calculating a local tracking energy to determine an updated target template for each image of the second plurality of images according to an iterative nonlinear optimization:

$$T_{n+1} = \underset{T_{n+1}}{\arg\min} \sum_i \|I_{n+1}(T_{n+1}(s_i)) - J_i\|^2; \text{ such that}$$

$$T_{n+1} = \underset{T_n}{\arg\min} \, 1 = 4, 3 \sum_i \|I^{(l)}_{n+1}(T_{n+1}(s_i)) - J^{(l)}_i\|^2; \text{ and}$$

$$T_{n+1} = \underset{T_n}{\arg\min} \, 1 = 2, 1, 0 \sum_i \|I^{(R)}_{n+1}(T_{n+1}(s_i)) - J^{(l)}_i\|^2$$

are used to determine the updated target template associated with each image of the second plurality of images.

19. The non-transitory computer readable medium of claim 18 wherein the instructions further cause the device to perform operations comprising:
determining a pixel margin for the target;
determining when a center of the target has moved from inside the pixel margin to outside the pixel margin; and
initiating a global movement tracking of the scene for a third plurality of images following the second plurality of images based on the determination that the center of the target has moved outside the pixel margin; and
wherein the center of the target is identified by a center pixel of the target template moving to within a set number of pixels from an edge of a trigger image, wherein the set number of pixels is associated with the pixel margin.

20. The non-transitory computer readable medium of claim 19 wherein the operations for the global movement tracking comprise:
sampling a fixed set of points g within each image of the third plurality of images following the initiation of the global movement tracking;
calculating a transform ΔT to estimate a minimum value for:

$$\Delta T = \underset{\Delta T}{\arg\min} \sum_i \|I^{(l)}_{n+1}(\Delta T(g_i)) - I^{(l)}_n\|^2;$$

wherein the minimum value is estimated using:

$$\Delta T = \underset{\Delta T}{\arg\min} \, l = 4, 3, 2, 1, 0 \sum_i \|I^{(l)}_{n+1}(\Delta T(g_i)) - I^{(l)}_n\|^2$$

to generate a target transform where:

$$\hat{T}_{n+1} = \Delta T \cdot \hat{T}_n.$$

* * * * *